US011734420B2

(12) United States Patent
Pasricha et al.

(10) Patent No.: US 11,734,420 B2
(45) Date of Patent: Aug. 22, 2023

(54) SNOOPING INVALIDATION AND SNOOPING DETECTION DEVICE AND METHOD

(71) Applicant: Colorado State University Research Foundation, Fort Collins, CO (US)

(72) Inventors: Sudeep Pasricha, Fort Collins, CO (US); Venkata Yaswanth Raparti, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 484 days.

(21) Appl. No.: 16/887,756

(22) Filed: May 29, 2020

(65) Prior Publication Data

US 2020/0380121 A1 Dec. 3, 2020

Related U.S. Application Data

(60) Provisional application No. 62/855,160, filed on May 31, 2019.

(51) Int. Cl.
 *G06F 21/55* (2013.01)
(52) U.S. Cl.
 CPC ...... *G06F 21/554* (2013.01); *G06F 2221/034* (2013.01)
(58) Field of Classification Search
 CPC ... G06F 21/554; G06F 2221/034; G06F 21/71
 See application file for complete search history.

(56) References Cited

U.S. PATENT DOCUMENTS

| 10,719,631 | B2* | 7/2020 | Hu | H04L 63/1433 |
| 10,902,166 | B2* | 1/2021 | de Lescure | G06F 15/7825 |
| 2016/0088014 | A1* | 3/2016 | Chandran | H04L 63/1458 726/23 |
| 2021/0342690 | A1* | 11/2021 | Wang | G06N 3/08 |
| 2022/0156366 | A1* | 5/2022 | Mishra | G06F 7/582 |

OTHER PUBLICATIONS

V.Y.Raparti, S. Pasricha "RAPID: Memory-Aware NoC for Latency Optimized GPGPU Architectures" IEEE Transactions on Multi-Scale Computing Systems, vol. 4, No. 4, pp. 874-887, Oct.-Dec. 2018.
V.Y.Raparti, S. Pasricha "DAPPER: Data Aware Approximate NoC for GPGPU Architectures." Proc. IEEE/ACM NOCS 2018, 8 pages.
Arteris, http://www.arteris.com/.
Y. Yarom et al., "Flush+ Reload: A High Resolution, Low Noise, L3 Cache Side-Channel Attack." Proc. USENIX Security Sym. 2014.
S. Bhunia, et al., "Hardware Trojan attacks: Threat analysis and countermeasures." Proc. IEEE, vol. 102, No. 8, pp. 1229-1247, 2014.

(Continued)

*Primary Examiner* — Christopher A Revak
(74) *Attorney, Agent, or Firm* — Meunier Carlin & Curfman LLC

(57) ABSTRACT

A snooping invalidation module is implemented at the network interface for a given core, or processing element, of a multicore or manycore device, e.g., NoC device, to discard packets with invalid header flits (e.g., duplicate packets) from being injected into the device, e.g., by a malicious hardware trojan implemented in the network interface. In some embodiments, a data-snooping detection circuit is implemented to detect a source of an on-going attack.

19 Claims, 11 Drawing Sheets

(56) References Cited

OTHER PUBLICATIONS

N.E.C. Akkaya, et al. "Secure chip odometers using intentional controlled aging." Proc. IEEE Host 2018.

D. Park et al. "Exploring fault-tolerant network-on-chip architectures." Proc. of the Intl. Conf. on Dependable Systems and Networks (DSN), 2006.

S. Shamshiri, et al. "End-to-end error correction and online diagnosis for on-chip networks." Proc. of the International Test Conference (ITC), 2011.

JYV Manoj Kumar, et al. "Run Time Mitigation of Performance Degradation Hardware Trojan Attacks in Network on Chip." Proc. IEEE Computer Society Annual Symposium on VLSI (ISVLSI), 738-743, 2018.

J. Sepúlveda, et al. "Reconfigurable security architecture for disrupted protection zones in NoC-based MPSoCs." Proc. IEEE ReCoSoC, 2015.

D. Ancajas, et al. "Fort-nocs: Mitigating the threat of a compromised noc." Proc. ACM Design Automation Conference, 2014.

T. Boraten, et al. "Packet security with path sensitization for NoCs." Proc. IEEE Date, 1136-1139, 2016.

H.M. Wassel, et al. "SurfNoC: a low latency and provably non-interfering approach to secure networks-on-chip." Proc. ACM SIGARCH Computer Architecture News (vol. 41, No. 3, pp. 583-594).

S.V.R Chittamuru, I. Thakkar, S. Pasricha "SOTERIA: exploiting process variations to enhance hardware security with photonic NoC architectures." Proc. ACM//IEEE Design Automation Conference (DAC) 2018.

S. Skorobogatov, "Physical attacks and tamper resistance," in Introduction to Hardware Security and Trust, Springer Berlin/Heidelberg, 2011.

E. Dubrova, et al. "Secure and efficient LBIST for feedback shift register-based cryptographic systems," Proc. International Test Conf. (ITC), 2014.

P. Kocher, et al., "Differential power analysis." Springer-Verlag, 1999.

E. Dubrova, et al. "Keyed logic BIST for Trojan detection in SoC." Proc. IEEE International Symposium on System-on-Chip (SoC), 2014.

M. Oya, "In-situ Trojan authentication for invalidating hardware-Trojan functions." Proc. IEEE ISQED, 2016.

M. Hussain, et al. "EETD: An Energy Efficient Design for Runtime Hardware Trojan Detection in Untrusted Network-on-Chip." Proc IEEE Computer Society Annual Symposium on VLSI (ISVLSI) 2018.

A. Prodromou, et al. "Nocalert: An on-line and real-time fault detection mechanism for network-on-chip architectures." Computer Sci and Eng, 2015.

T. Boraten, et al. "Secure model checkers for Network-on-Chip (NoC) architectures." Proc. IEEE Great Lakes Symposium on VLSI, 2016.

S.F. Mossa, et al. "Self-triggering hardware Trojan: Due to NBTI related aging in 3-D ICs." Integration, the VLSI Journal, vol. 58, pp. 116-124, 2016.

M.K. Papamichael, et al. "CONNECT: re-examining conventional wisdom for designing nocs in the context of FPGAs." Proc. FPGA, 2012.

Vivado HLS tool, Xilinx, https://www.xilinx.com/products/designtools/vivado/integration/esl-design.html.

S.R. Vangal, et al. "An 80-tile sub-100-w teraflops processor in 65-nm cmos." IEEE Journal of Solid-State Circuits, vol. 43, No. 1, pp. 29-41, 2008.

M. Gebhart, et al. "Running PARSEC 2.1 on M5, Technical Report TR-09-32", UT Austin, Department of Computer Science, Oct. 2009.

S. Bhardwaj, et al. "Predictive modeling of the NBTI effect for reliable design." Proc. IEEE Custom Integrated Circuits Conference, 2006.

V. Catania, et al. "Noxim: An open, extensible and cycle-accurate network on chip simulator." Proc. IEEE ASAP, 2015.

J. Hestness, et al. "Netrace: dependency-driven trace-based network-on-chip simulation." Proc. ACM Noc-Arch, 2010.

Cadence, https://www.cadence.com/content/cadence-www/tools/customic-analog-rf-design/layout-design/virtuoso-layout-suite.html.

\* cited by examiner

SNOOPING INVALIDATION AND SNOOPING DETECTION DEVICE AND METHOD

RELATED APPLICATION

The application claims priority to, and the benefit of, U.S. Provisional Application No. 62/855,160, titled "Security Enhancement for Multicore Processor Chips via Lightweight Snooping Invalidation and Aging-based Snooping Detection Mechanisms", filed May 31, 2019, which is incorporated by reference herein in its entirety.

GOVERNMENT SUPPORT CLAUSE

This invention was made with government support under grant CCF1813370 awarded by the National Science Foundation. The government has certain rights in the invention.

FIELD OF THE INVENTION

The present disclosure generally relates to communication devices, in particular, hardware-level security features for photonic communication devices, including those that support multicast/broadcast communication.

BACKGROUND

With the rise in number of processing cores and growing parallelism in applications, the communication traffic in a manycore processor has been increasing. Chip designers and manufacturers are moving towards network-on-chip (NoC) as their de-facto intra-chip communication fabric. Typically, emerging manycore processors have tens to hundreds of components that are designed either by in-house engineers or obtained from third-party vendors (3PIP), and then finally integrated together in a single global facility. With the growing complexity in NoC design, designers are opting for third-party NoC IPs, e.g., to connect the components in their processors. This global trend of distributed design, validation, and fabrication has led to major challenges in ensuring secure execution of applications on manycore platforms, in the presence of potentially untrusted hardware and software components. Third-party hardware designs are frequently used to reduce the hardware design time of complex chip-multiprocessor devices, which often occurs when chips design are sent to third-party fabrication centers. However, third party designs can introduce security risks such as hardware trojans (HTs), which can lead to leakage of critical and sensitive information flowing through the chip-multi-processor devices. These issues are particularly acute for broadcast and multicast communication, e.g., network-on-chip.

NoCs are vulnerable for hardware trojan (HT) attacks as they have a complex design that can be used to hide an HT which cannot be easily detected via functional verification. HTs can be placed in NoC links, routers, or network interfaces (NIs) to secretly snoop on the data or corrupt data passing through them. Typically, in data-snooping attacks HTs create duplicate packets with modified headers and send them into the NoC for an accomplice thread to receive them.

There is increasing interest and benefit in addressing security risks in modern computing systems, particularly in the designs of multi- and manycore devices, including those configured as network-on-chip devices.

SUMMARY

The exemplified methods and systems provide a snooping invalidation module (SIM) that is implemented at the network interface for a given core, or processing element, of a multicore or manycore device, e.g., NoC device, PNoC device, to discard packets with invalid header flits (e.g., duplicate packets) from being injected into the device (e.g., by a malicious hardware trojan implemented in the network interface). The snooping invalidation module may be implemented in a number of ways, e.g., in the network interface, the router interface, or the processing elements. In some embodiments, the snooping invalidation module is implemented across the processing elements and the network interface to prevent reverse engineering or tampering. In some embodiments, the snooping invalidation module is implemented at an output queue of a given network-interface.

In addition, or as an alternative to, a data-snooping detection circuit (the circuit also being referred to as "THANOS") is implemented to detect a source of an on-going attack. The snooping detection circuit may be used to detect data-snooping attacks at the processing element where an accomplice thread is executing.

The snooping invalidation module and snooping detection circuit may be solely, or in combination, used to protect against snooping attacks, e.g., from hardware trojans located in the NoC device. In some embodiments, the snooping invalidation module and snooping detection circuit may be used in combination to provide a comprehensive protection framework that proactively mitigates against future attacks and safeguards application data. The protection would be range for the entire service/operational life of the processor. The exemplary security mechanisms can be configured against tampering even when the adversary can reverse engineer the NoC device to insert hardware trojans, e.g., in the netlist. The exemplary system and method is configured to work irrespective of the hardware trojan triggering process to start snooping attacks such as special flit data, circuit aging, or temperature. Experimental results shows a NoC device configured with the snooping detection module and the data-snooping detection circuit can have mitigated snooping attack response while dedicating a minimal area of about 2.15% for the security prosecution, which has a power overhead of about 5.5% for the device. Experimental results shows the snooping detection module and the data-snooping detection circuit also improved the NoC device performance by 48.4% in the presence of hardware trojan attacks.

In an aspect, a system is disclosed comprising a plurality of processing units interconnected by a network-on-chip network, wherein each of the plurality of processing units is coupled to a network interface configured to generate a plurality of flits, wherein the system further comprises a snooping invalidation logic circuit configured to perform a validation operation to detect and discard a duplicate flit header generated in the network interface.

In some embodiments, the network interface is configured to generate each flit of the plurality of flits with i) an encoded key (k) encoded from at least a counter (C) associated with a given flit and ii) a table index (c_id) identifying a location of the counter (C) as stored in a validation table of the snooping invalidation logic circuit, wherein the encoded key and the table index are co-indexed in a buffer of the network interface, and wherein the buffer is indexable for each of the plurality of flits by a buffer index (B_id) associated with a given counter (C), and wherein each indexable location of the buffer includes an instance of the encoded key (k) and an instance of the table index (c_id) for each counter (C), and wherein the snooping invalidation logic circuit, during the validation operation, is configured to detect the duplicated header flit by determining a mismatch between i) a given encoded key (k) retrieved from a given header flit and ii) an encoded key (k') retrieved from the buffer at an indexed location determined from the table index (c_id) retrieved from the given header flit.

In some embodiments, the validation operation to detect the duplicated header flit is performed in a single clock cycle of the each of the plurality of processing units.

In some embodiments, each of the plurality of processing units is configured to generate the encoded key (k) via XOR operators performed on i) the counter (C) associated with the given flit, ii) a buffer index (B_id) associated with the counter (C), and iii) a flit payload (e.g., destination id).

In some embodiments, the snooping invalidation logic circuit comprises the validation table, a comparator having a buffer length of the encoded key, and a decoding XOR operator having the buffer length of the encoded key.

In some embodiments, the snooping invalidation logic circuit and associated validation table is lightweight employing an additional area of less than 5% to a baseline network interface configured to generate the same but lacking the snooping invalidation logic circuit and associated validation table.

In some embodiments, each of the plurality of processing units is configured to generate an encrypted key for a given flit, and wherein the snooping invalidation logic circuit is configured to invalidate the duplicate flit header generated by a malicious hardware trojan embedded in the network interface using the encrypted key.

In another aspect, a snooping detection module is disclosed comprising a mixed-analog and digital transistor circuit implemented at respective interfaces between each respective processing unit, or a substantial portion, of the plurality of processing units and a corresponding network interface associated with the respective processing unit, wherein the mixed-analog and digital transistor circuit is configured to transition between a saturated state and a triode state based on a ratio between signals received and transmitted through the mixed-analog and digital transistor circuit, wherein the snooping detection module is configured to compare the transition time from the triode state to the saturated state and a threshold time, and wherein the snooping detection module is configured to generate, based the comparison, at its output, a notification signal to the respective processing unit or a monitoring circuit, wherein the notification signal indicates the respective processing unit as a source of a snooping attack in the system.

In some embodiments, the snooping detection circuit comprises one or more MOS transistors configured to undergo stress-recovery periods in transitioning between ON and OFF operations that leads to threshold voltage (Vth) degradation of the one or more MOS transistors.

In some embodiments, the snooping detection circuit further comprises a second set of one or more MOS transistors configured to undergo stress-recovery periods in transitioning between ON and OFF operations that leads to threshold voltage (Vth) degradation of the second set of one or more MOS transistors, and wherein operation of the one or more MOS transistors and the second set of one or more MOS transistors are selectable via inputs of the snooping detection circuit.

In some embodiments, the snooping detection circuit uses the second set of one or more MOS transistors after the one or more MOS transistors has degraded from the threshold voltage (Vth) degradation.

In some embodiments, the one or more MOS transistors comprise a PMOS or NMOS transistor.

In some embodiments, the plurality of processing units collectively form a manycore chip comprising at least 64 cores.

In some embodiments, the manycore chip comprises a multiprocessor system on chip (MPSoC) or chip multiprocessors (CMPs).

In another aspect, a method is disclosed of operating the plurality of processing units interconnected by the network-on-chip network of claim 1, wherein the method comprises generating the plurality of flits each comprising i) the encoded key (k) encoded from the at least the counter (C) associated with the given flit and ii) the table index (c_id) identifying the location of the counter (C) as stored in the validation table of the snooping invalidation logic circuit; and detecting the duplicated header flit by determining the mismatch between i) the given encoded key (k) retrieved from the given header flit and ii) the encoded key (k') retrieved from the buffer at the indexed location determined from the table index (c_id) retrieved from the given header flit.

In some embodiments, the method further includes encoding, by the processing unit, the encoded key (k) encoded from at least the counter (C) associated with the given flit.

In another aspect, a method is disclosed comprising monitoring, via a snooping detection module, signals received and transmitted for a given processing unit configured with the snooping detection module, wherein the snooping detection module comprises a mixed-analog and digital transistor circuit configured to transition between a saturated state and a triode state based on a ratio between the signals received and transmitted through the mixed-analog and digital transistor circuit, wherein the snooping detection module is configured to compare i) the transition time from the triode state to the saturated state and ii) a threshold time, and wherein the snooping detection module is configured to generate, based the comparison, at its output, a notification signal to the respective processing unit or a monitoring circuit, wherein the notification signal indicates the respective processing unit as a source of a snooping attack in the system; and generating the notification for the given processing unit when the resulting transition time for the snooping detection module exceeds the compared threshold time, wherein the notification provides an indication that the given processing unit is a source of a snooping attack.

In some embodiments, the threshold time is configured so the notification is generated after 2 hours of the given processing unit performing a potential malicious task.

In another aspect, a system is disclosed comprising a plurality of processing units interconnected by a network-on-chip communication, wherein each of the plurality of processing units is coupled to a network interface configured to generate a plurality of flits, wherein the system further comprises a snooping invalidation means for detecting and discarding a duplicate flit header generated in the network interface by a hardware trojan embedded in the network interface.

In another aspect, a system is disclosed comprising a snooping detection means for detecting source within the system of snooping attacks, wherein the source comprises a hardware trojan embedded in the system.

BRIEF DESCRIPTION OF THE DRAWINGS

Embodiments of the present invention may be better understood from the following detailed description when read in conjunction with the accompanying drawings. Such embodiments, which are for illustrative purposes only, depict novel and non-obvious aspects of the invention. The drawings include the following figures.

DETAIL DESCRIPTION

Each and every feature described herein, and each and every combination of two or more of such features, is included within the scope of the present invention provided that the features included in such a combination are not mutually inconsistent.

Example System

Figure 1:
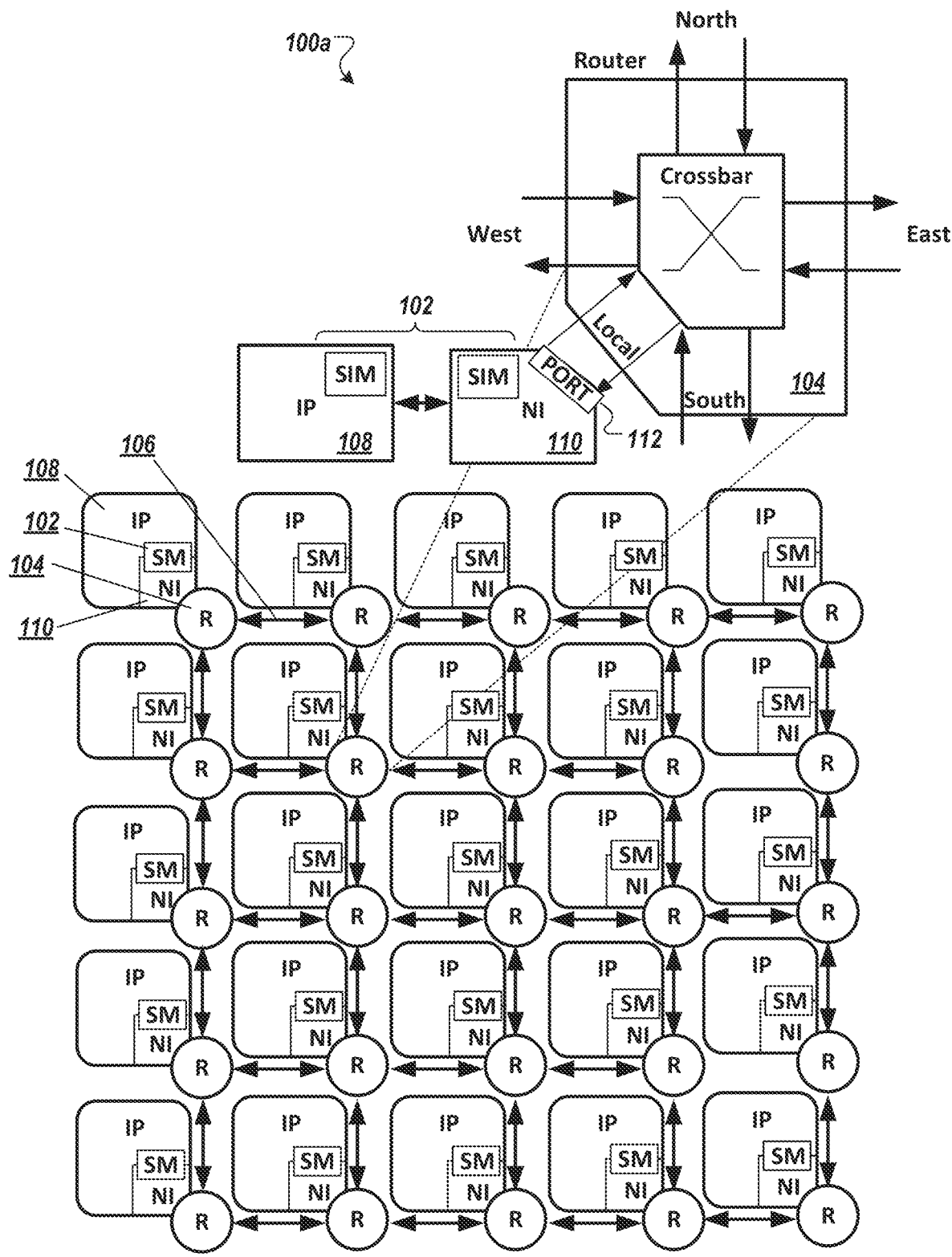
FIG. 1 shows an example network-on-chip (NoC) device configured with a snooping invalidation module in accordance with an illustrative embodiment.

FIG. 1 shows an example network-on-chip (NoC) device 100 configured with a snooping invalidation module 102 (also referred to herein as a "SIM" 102) in accordance with an illustrative embodiment. A "network-on-chip" or "network on a chip" is a network-based communications subsystem on an integrated circuit ("microchip") that connects between modules in a system-on-a-chip (SoC) device. The modules may be semiconductor IP cores schematizing various functions of the computer system and may be designed to be modular with respect to the network interconnect. Examples of NoC device include, for example, but not limited to, network-on-chips for multi-cores, graphics processing units (GPUs) (e.g., for computer graphics, video gaming, and accelerating artificial intelligence). The NoC device may be implemented with silicon photonics and/or 3D stacking configurations.

In FIG. 1, the network-on-chip device 100 includes a plurality of interconnected routers 104 that each connects, via links 106 (e.g., metallic link, photonic link, or a combination thereof), to a plurality of processing elements (PE) 108 (shown as "IP" core 108) through a respective network interface 110. As later discussed herein, the snooping invalidation module 102 is implemented in part in the network interface 110 and in part in the IP core 108. In other embodiments, the snooping invalidation module 102 could be implemented entirely in the network interface 110 or in the IP core 108.

In FIG. 1, a two-dimensional mesh-based NoC device is shown though other NoC topology (e.g., 3D stacked as noted above among others) and manycore devices, and the like, may be implemented with the snooping invalidation module 102. In FIG. 1, a packet entering the NoC device 100 is routed towards their destination by routers 104. Each of the routers 104, for example, may be configured with a hopby-hop, turn-based distributed deadlock free XY routing algorithm. The router 104, in some embodiments, comprises a 3-stage pipelined router in which the 3-stage includes a buffer write (BW), RC+VCA+SA (routing computation, visual channel allocation, and switch allocation), link traversal (LT) (also can be expressed as {BW, RC+VCA+SA, LT}). The NoC device 100 includes a switch (e.g., wormhole switch) and virtual-channel buffer (e.g., 4-VC buffers) at each input port 112 (shown as "port" 112). The processing elements (PEs) 108 are configured to communicate using messages that are passed to the network interface (NI) 110 which are configured to packetize the packets before sending them other elements of the NoC device 100. The network interface (NI) 110 are also configured to receive packets 114 and to depacketize and sent them to the connected PE (108). An example of a processing element (PE) 108 includes an ARM Cortex-A73 core, which is configured with an AXI interface for communication. Other cores and like processing elements may be used. In the example, each PE is configured with a private L1 cache and a shared distributed L2 cache, the LC cache uses a scalable directory-based cache coherence protocol to send messages in the form of NoC packets.

Example Snooping Invalidation Module

Figure 2:
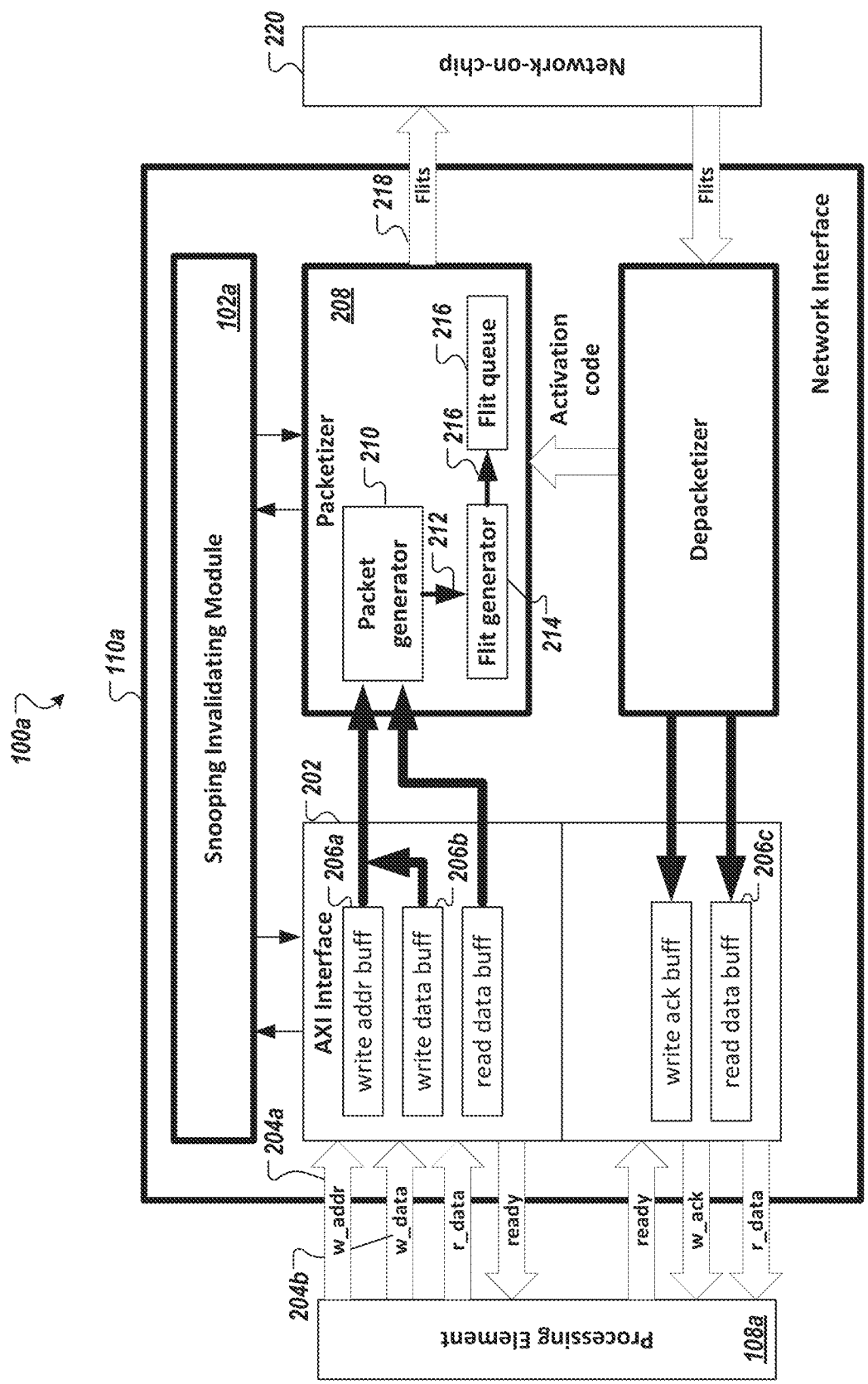
FIG. 2 shows an example implementation of a NoC device 100 configured with a snooping invalidation module implemented in a network interface 110 for an IP core in accordance with an illustrative embodiment.

FIG. 2 shows an example implementation of a NoC device 100 (shown as 100a) configured with a snooping invalidation module 102 (shown as 102a) implemented in a network interface 110 (shown as 110a) for an IP core 108 (shown as "Processing Element" 108a) in accordance with an illustrative embodiment.

In FIG. 2, the network interface 110a is configured to receive messages (e.g., comprising a write address 204a and write data 204b) from the processing element 108a via an AXI interface 202, which stores the messages in its buffers 206 (shown as "write addr buff" 206a and "write data buff"

206b). The AXI interface 302 also includes read buffer (shown as 206c) to receive messages to direct to the processing element 108a.

The network interface 110a includes a packetizer module 208 (also referred to as "packetizer" 208) configured, via a packet generator 210, to create packets 212 by appending source ID information, destination ID information, and virtual channel ID information to command messages. The network interface 100a includes a flit generator 214 configured to divide the packets 212 into flits 216 with the header flit containing the NoC routing-related information. The flit generator 214 then injects the packet flits 216 into a circular flit queue 216 that is configured to be accessible, e.g., via head and tail pointers. During operation, after the packetizer 208 injects a flit 218, the tail pointer of the queue 216 is incremented, and after a flit 218 is transmitted to a router (e.g. 104), the head pointer is incremented to transmit the next flit.

Figure 6:
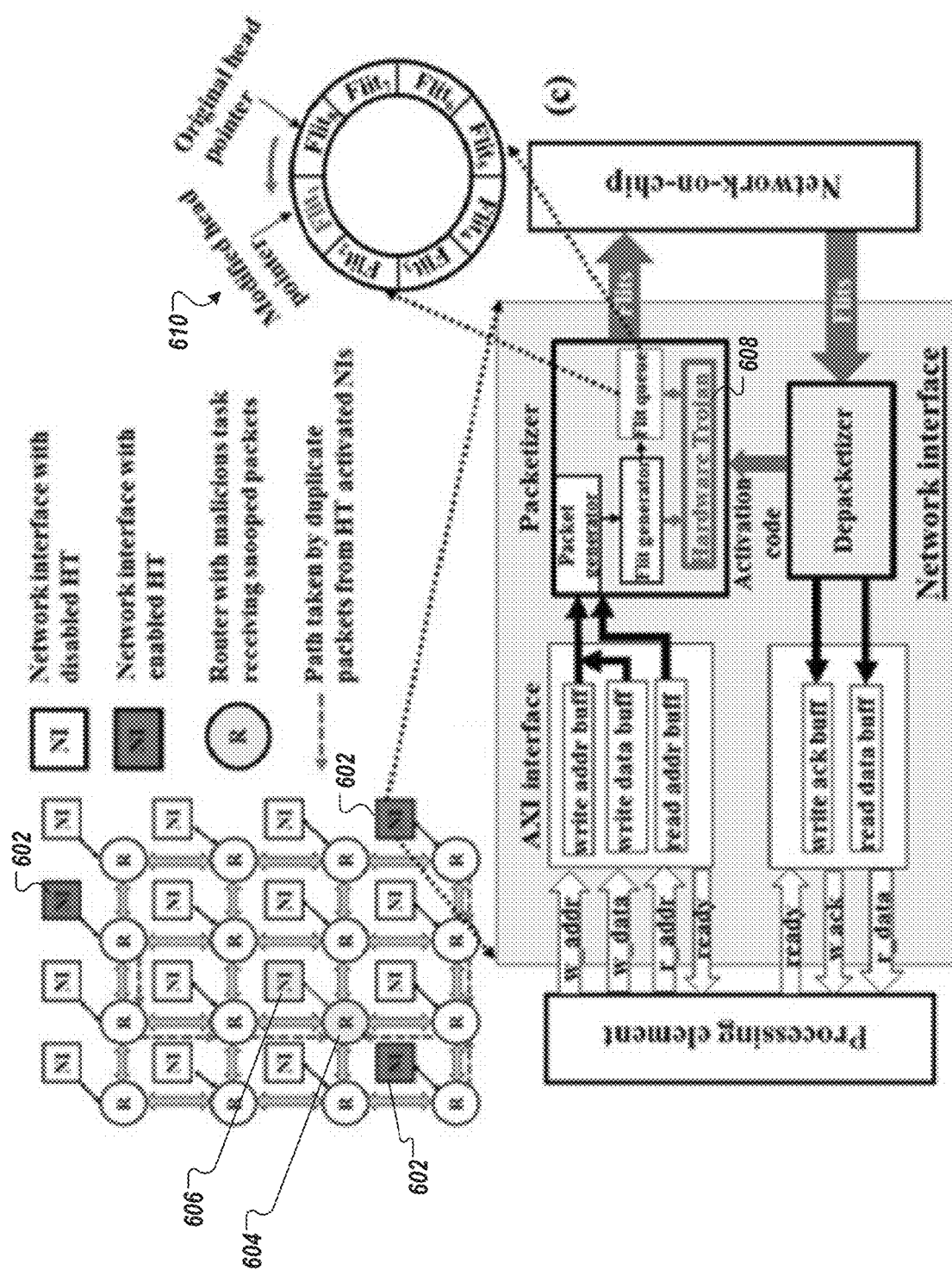
FIG. 6 shows an example attack model on the NoC device of FIG. 2 in accordance with an illustrative embodiment.

The snooping invalidation module (e.g., 102a) can be used to secure the NoC device (e.g., 100a) by invalidating flit headers generated in a tampered network interface (e.g., 110a) to which the snooping invalidation module (e.g., 102a) is implemented, e.g., where the network interface is fabricated with a malicious hardware trojan (see FIG. 6). Indeed, the snooping invalidation module (e.g., 102a) can invalidate and disregard duplicated or corrupted flit headers and their associated flits prior to the duplicated or corrupted flits being transmitted to the network-on-chip and subsequently other modules/IP cores in the NoC device. Notably, the snooping invalidation module (e.g., 102a) can be configured for low-power and low latency operation, e.g., using lightweight computations that are tailored to mitigate snooping attacks.

To reduce the likelihood, and/or prevent, reverse engineering or tampering (e.g., by third-party interoperability program (3PIP)), the snooping invalidation module (e.g., 102a) may be implemented in part in the network interface (e.g., 110b) and in part in the processing elements (e.g., 108a). The snooping invalidation module (e.g., 102a) may be used in combination with traditional ECC-based security enhancement mechanisms that can be used to secure routers and memory of the NoC device 100.

Figure 3:
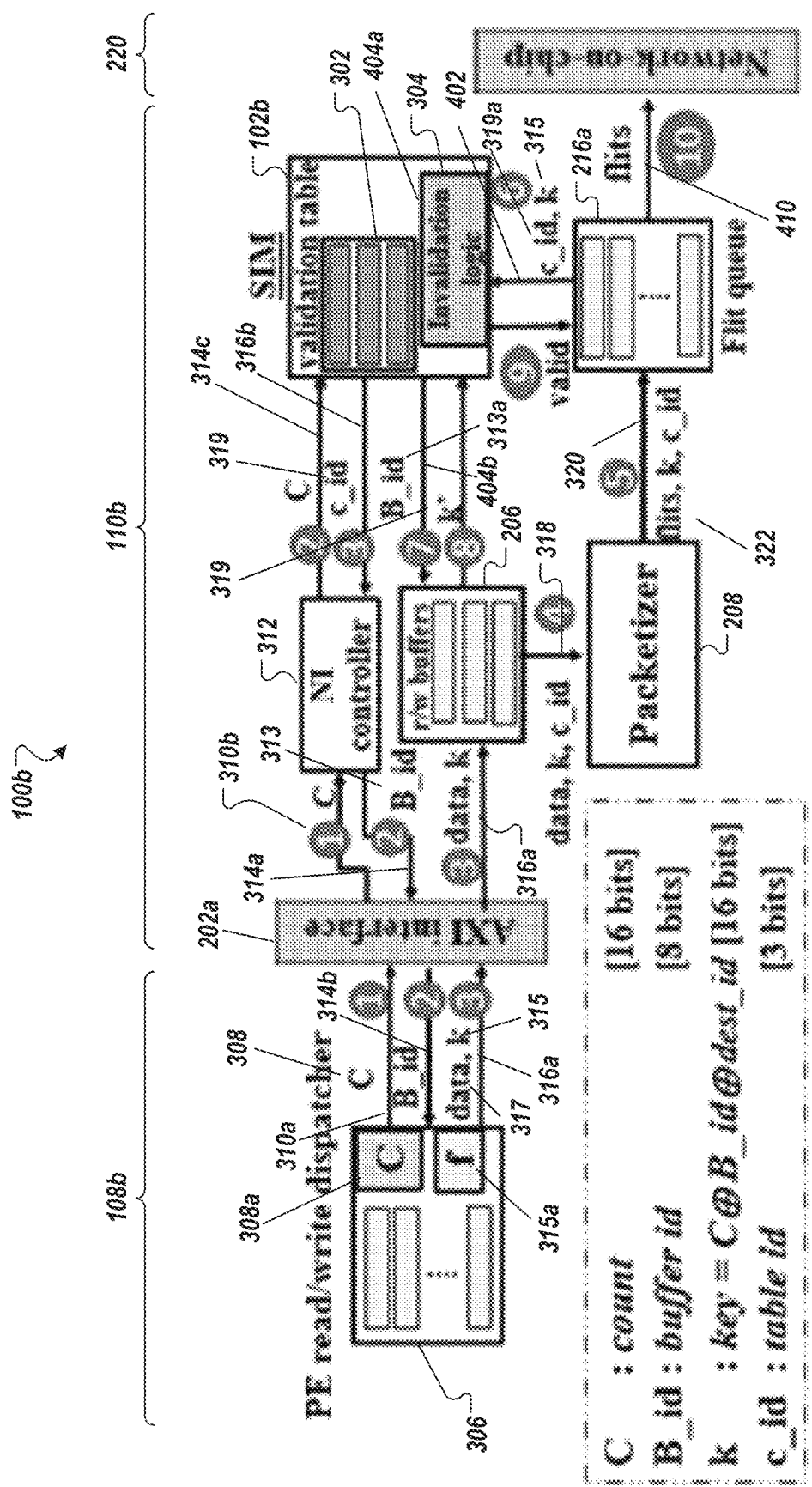
FIG. 3 shows an example implementation of the snooping invalidation module of FIGS. 1 and 2 in a NoC device in accordance with an illustrative embodiment.

FIG. 3 shows an example implementation of the snooping invalidation module 102 (shown as 102b) of FIGS. 1 and 2 in a NoC device 100 (shown as 100b) in accordance with an illustrative embodiment.

In FIG. 3, the processing elements 108 (shown as 108b) and the network interface 110 (shown as 110b) are configured to attach encoding information (encoding key) with the data generated by the processing element 108b to be transmitted to the NoC device 100b. These operations are shown in operations "1" to "5". The snooping invalidation module 102b comprises i) a SIM validation table 302 that stores a part of the encoding information, or intermediate data, and ii) a SIM invalidation logic 304 that validates the encoded information as attached in a given flit to assess the uniqueness of the flit for the purpose of identifying when a flit header has been altered or duplicated. The validation operation is shown in operations "6" to "9" which is shown and discussed in relation to FIGS. 3 and 4. Indeed, the attached encoding information and snooping invalidation modules, collectively, provide a security-enhanced network interface that safeguards the network interface (e.g., 110b) from tampering and/or from malicious hardware trojan be inserted into the network interface.

In operation "1" (shown via 310a and 310b) (e.g., in a first associated clock cycle or flit), a PE data dispatcher 306 (shown as "PE read/write dispatcher" 306) of the processing element 108b is shown to generate (via block "C" 308a) and send (shown as 310a and 310b) the generated count value "C" (shown as 308) to a network-interface controller 312 (shown as "NI controller" 312) of the network interface 110b. The count value "C" 308 is associated with a given flit and is associated clock cycle. The count value "C" 308 is be attached to the data stream outputted from the processing element 108b and is used directly, and indirectly, to index respective entries in the buffers (e.g., 206) and SIM tables (e.g., 302) used in the generation and the subsequent validation of that flit. The count value "C" 308 is shown in the example implementation of FIG. 3 to be implemented as a 16-bit value and corresponds to the length of a data (e.g., dest_id) used in the generation of an encoded key "k". Other bit size may be used, 24 bits, 32 bits, 40 bits, 56 bits, 64 bits, 128 bits, among others, which can be the same or different form the In the example of FIG. 3, the processing elements 108b and the network interface 110b employs a standard AXI hand-shake protocol (e.g., using ready, valid, and valid ready signals). However, other like protocols may be used without departing from the spirit of the disclosure, e.g., other bus protocols, e.g., PCIe, photonic-based protocols, as well as non-standard AXI protocols.

Referring still to operation "1" (e.g., in the same associated clock cycle or flit), the PE data dispatcher 306 sends the count value 308 along with an AXI "ready" signal to the network-interface controller 312. The processing element 108b (or PE data dispatcher 308) then changes the count value "C" 308, e.g., with an increment operator or look-up-table. The processing element 108b may perform the update with each outgoing data (e.g., 316a).

In operation "2" (shown via 314a, 314b, and 314c), the network-interface controller 312 sends/returns (shown as 314a and 314b), through the AXI interface 302, a reserved buffer identifier "B_id" (shown as 313) associated with the count value 308 to the PE data dispatcher 306 along with the AXI valid signal. The buffer identifier "B_id" 313 may be an 8-bit identifier, e.g., corresponding to the size of the buffers 206. Though as discussed above in relation to the count value "C" 308, other data size for the B_id may be used.

The PE data dispatcher 302 receives (314b) the incoming buffer identifier "B_id" 313 and uses it (e.g., in the same associated lock cycle or flit) to generate an encoded key "k" 315 using an operator (shown as "f" 315a), e.g., that performs XOR operations of the count value "C" 308, the buffer identifier "B_id" 313, and a data associated with the outgoing data packet. In the example of FIG. 3, the destination identifier (shown as "dest_id") of the packet is used in the XOR operation as shown in Equation 1. The destination identifier "dest_id" may be a 16-bit address, or other address size, used to address the IP core or modules of the NoC device 100.

$$k = C \oplus B\_id \oplus dest\_id \quad \text{(Equation 1)}$$

Simultaneously with the sending operations 314a, 314b (e.g., in the same associated clock cycle or flit), in operation "2", the network-interface controller 312 sends (shown as 314c) the count value "C" 308 to the snooping invalidation module 102b. The snooping invalidation module 102b receives and stores the count value "C" 308 in an entry in the SIM validation table 302 having a table entry identifier "c_id" 319.

In operation "3" (shown as 316a, 316b, and 316c) (e.g., in the same associated clock cycle or flit), the PE data dispatcher 306 sends (316a) a write message comprising the encoded key "k" 315 and the write data (shown as 317) (collectively shown as a write message "data, k" 315, 317) to the buffers 206, which toggles the valid "ready" signal, e.g., to high. The buffers 206 store the encoded key k" 315 in the entry associated with the buffer identifier "B_id" 313 corresponding to the buffer location/entry sent in 314b. The buffers 206 also store the write data 317 or a portion thereof, e.g., destination address "dest_id" (shown as 317a), used in the generation of the encoded key "k" 315 to be used in the validation operation.

Figure 5:
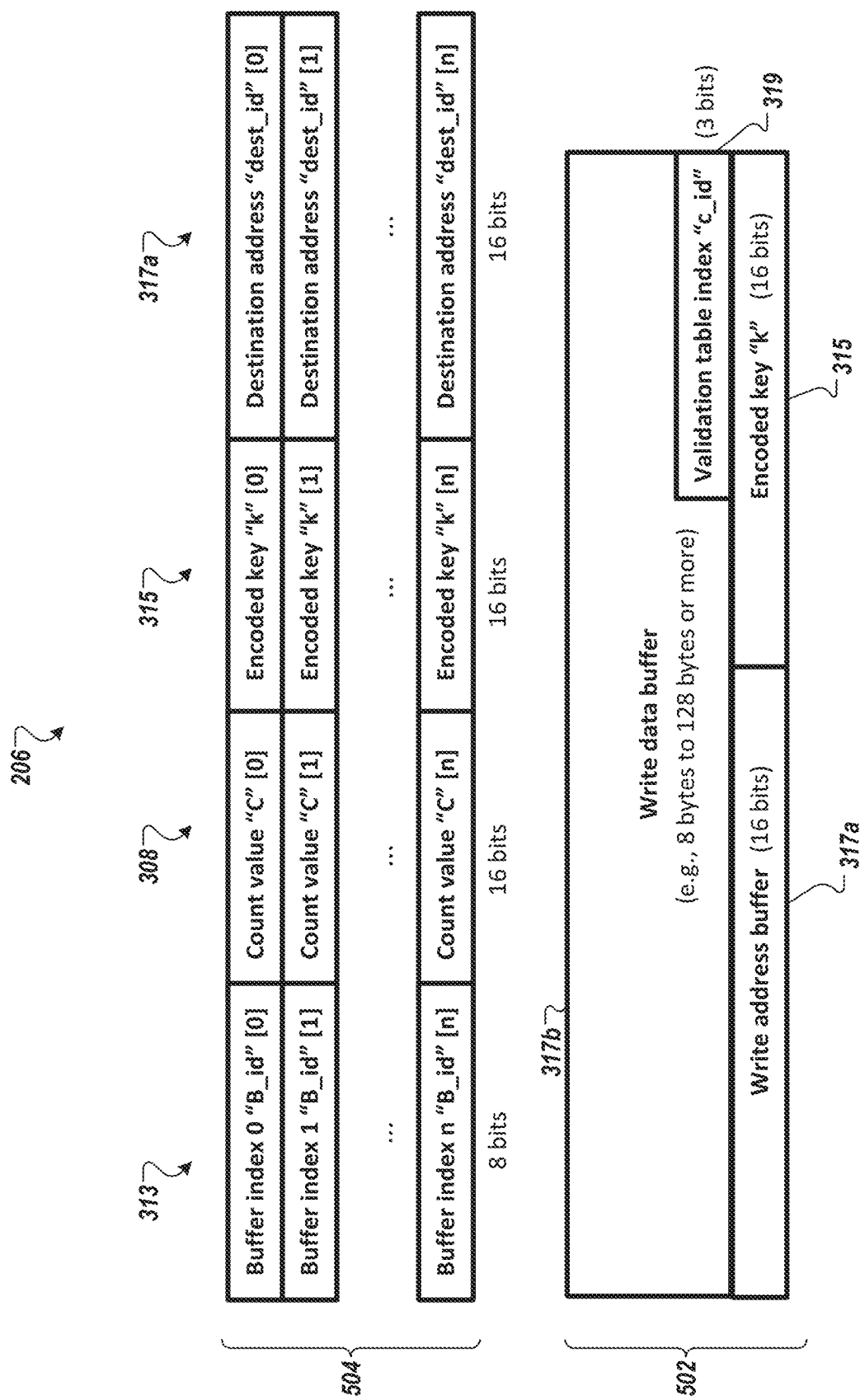
FIG. 5 shows example buffers of the network interface of FIG. 3 in accordance with an illustrative embodiment.

FIG. 5 shows an example of the buffers 206 of the network interface (e.g., 110b) of FIG. 3 in accordance with an illustrative embodiment. As shown in FIG. 5, the buffers 206 may have an output buffer (shown as 502) to buffer the write data 317 (e.g., show as write address buffer 317a as well write data buffer 317b), the encoded key "k" 315, and a table entry identifier "c_id" 319 to be received from the SIM validation table 302. The buffers 206 also includes sub-buffers/entries (shown as 504) that are indexable by the buffer identifier "B_id" 313 for the count value "C" 308, the encoded key "k" 315, and the destination address "dest_id" 317a.

The table entry identifier "c_id" 319 may be a 3-bit identifier, e.g., corresponding to the number of entries of the SIM validation table 302, which may be selected based on the number of elements in the flit queue 216.

Referring back to FIG. 3, in the same operation "3" (e.g., in the same associated clock cycle or flit), the snooping invalidation module 102b sends (316b$_{[PT1]}$), to the network-interface controller 312, a table entry identifier or entry index "c_id" (shown as 319) for the entry in the SIM validation table 302 having the stored count value "C" 308 for the given flit or associated clock cycle. Of course, other table size and associated indexing size may be used.

The network-interface controller 312 receives (316b) the table entry identifier "c_id" 319 to combine it with the combined data message "data, k" 315, 317 in the output buffer 502 along with the associated encoded key "k" 315 and the buffer identifier "B_id" 313 received from the PE data dispatcher 308. Notably, as can be seen in FIG. 5, while the size of the payload data may vary for a given design depending on the message type, e.g., from 8 bytes to 128 bytes or more, the portion of the message to be used by the snooping invalidation module, including the encoded key "k" 315, the validation table index "c_id" 319 only takes up an additional 19 bits for the example provided in FIG. 3.

In operation "4" (shown as 318), the combined "data" 317, "k" 315, and "c_id" 319 are sent (318) to the packetizer 208 to generate packets and the associated flits (shown as 322).

In operation "5" (shown as 320), the packetizer 208 sends (320) the flits 322 with the encoded key "k" 315, and the validation table index "c_id" 319 to a flit queue 216 (shown as 216a). The flit queue 216a copies the encoded key "k" 315 and the validation table index "c_id" 319 into the header flit. In some embodiments, the header flit includes bit allocation to store the destinations of source-routing path and additionally includes a 24 reserve bits to store the 19 bits of the encoded key "k" 315 and the validation table index "c_id" 319. Example of a header flit is described in [26] which is incorporated by reference herein in its entirety. The source-routing path may be unused where distributed routing is adopted for the NoC device 100. The flits are then saved in the output flit queue.

Flit Header Invalidation Operation. Prior to the flit being outputted from the flit queue 216a to the NoC 220, the snooping invalidation module 102b validates or invalidates the flit header in the flit queue 216.

Figure 4:
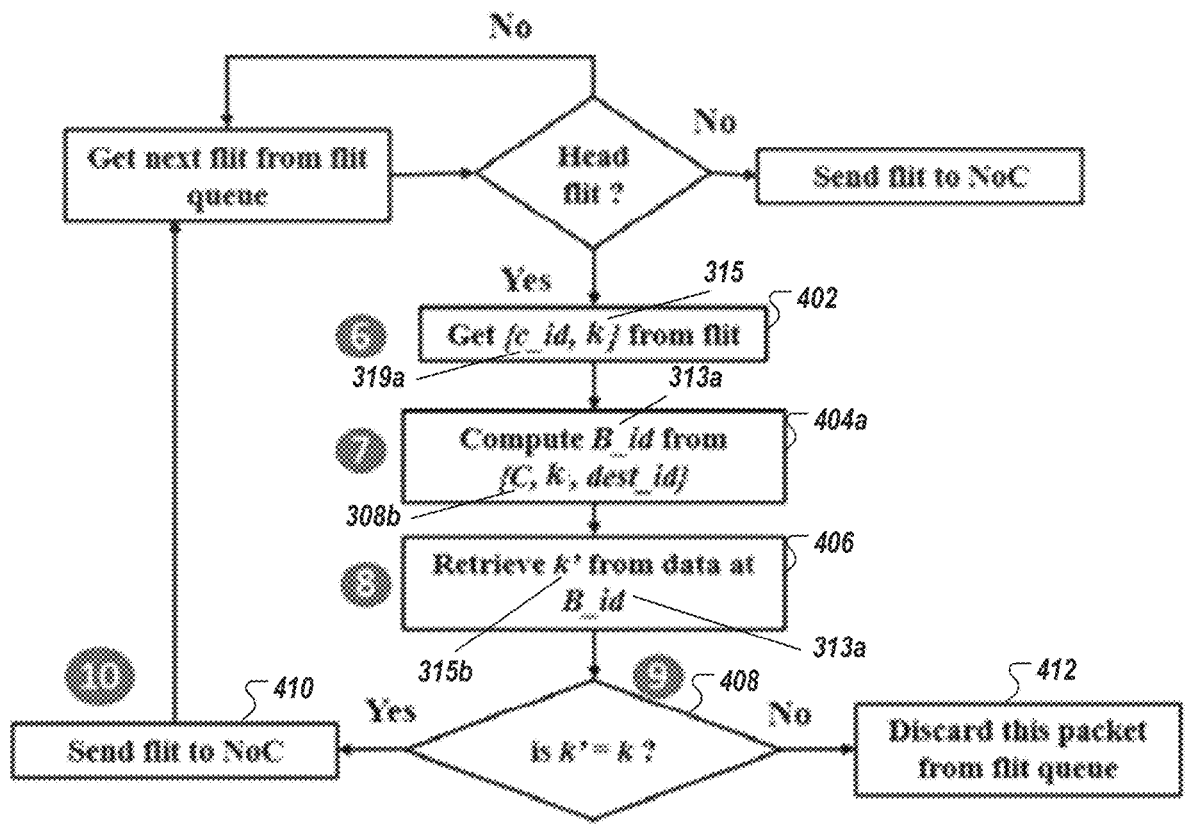
FIG. 4 shows a flow chart of a method of operating the snooping invalidation module of FIG. 3 to validate or invalidate the flit header in the flit queue in accordance with an illustrative embodiment.

FIG. 4 shows a flow chart of a method of operating the snooping invalidation module 102b of FIG. 3 to validate or invalidate the flit header (e.g., 322) in the flit queue (e.g., 216a) in accordance with an illustrative embodiment. As shown in FIGS. 3 and 4, to validate the flit header, the snooping invalidation module 102b retrieves a validating encoded key "k" (as a copy of a stored encoded key "k") retrieved from the buffer 206 using a buffer index valued "B_id" decoded from i) the encoded key "k" retrieved from the flit header and a count value "C" retrieved the SIM validation table 302 using the validation table index "c_id" 319 retrieved from the flit header.

As shown in FIG. 3 (and FIG. 4), in operation "6" (shown as 402), the snooping invalidation module 102b reads (402) the destination address "dest_id" 317a (used to encode the encoded key "k" 315), the encoded key "k"$_{[PT2]}$ 315, and the validation table index "c_id" 319 from the header flit (shown as "Get {c_id, k} from flit" 402 in FIG. 4).

As shown in FIG. 3 (and FIG. 4), in operation "7" (shown as 404a, 404b), the invalidation logic 304 performs (404a) a decoding operation shown in Equation 2 to obtain a validating buffer identifier "B_id" (shown as 313a) to retrieve the validating encoded key "k" from the buffers 206. As shown via 404b (FIG. 3)d, the snooping invalidation module 102b sends the validating buffer identifier "B_id" 313a to the buffers 206.

$$B\_id = C \oplus k \oplus dest\_id \quad \text{(Equation 2)}$$

In Equation 2, the validating buffer identifier "B_id" 313a is determined as the output of an XOR operations performed using the destination identifier bits "dest_id" retrieved from the flit header, the encoded key bits "k" 315 retrieved from the flit header, and the count value "C" (shown as 308b) as retrieved from the SIM validation table 302 using the validation table index "c_id" (shown as 319a) retrieved from the flit header.

As shown in FIG. 3 (and FIG. 4), in operation "8" (shown as 406), the snooping invalidation module 102b retrieves (406) the validating encoded key "k" (shown as 315b) from the buffers 206, as a copy of a stored encoded key "k" located at a buffer entry for the validating buffer identifier "B_id" 313a.

As shown in FIG. 3 (and FIG. 4), in operation "9" (shown as 408), the snooping invalidation module 102b (e.g., via invalidation logic 306) compares (408) the retrieved validating encoded key "k" 315b with the encoded key bits "k" 315 retrieved from the flit header.

As shown in FIG. 3 (and FIG. 4), in operation "10" (shown as 410), if the two encoded keys match (i.e., k=k'), the snooping invalidation module 102b sends (410) a valid signal to the flit queue 216a that the header flit is valid and the corresponding flit is injected into the NoC (e.g. 220).

As shown in FIG. 3 (and FIG. 4), in operation "11" (shown as 412), if the two encoded keys do not match (i.e., k≠k'), the snooping invalidation module 102b sends (412) an invalid signal to the flit queue 216a that the header flit is invalid and the corresponding flit is discarded, including all the flits in the queue of the flit queue 416a.

Indeed, the snooping invalidation module 102b can efficiently detect duplicate packets (i.e., corrupted by a malicious hardware trojan) because, if the value of dest_id is modified by the hardware trojan, decoding operation via Equation 2 would lead to an incorrect value of validating buffer identifier "B_id" 313a, which would not retrieve the validating encoding value "k" that matches the encoding value "k" located in the data of packet sent in operation "3".

For broadcast/multicast packets, in some embodiments, multiple keys may be generated, at least one for each dest_id value. For the multiple keys, encoded key verification operations "8" and "9" may be performed on each of them separately. In some embodiments, after a packet is sent out, the corresponding read/write data buffer and validation table entries can be reused for the new data. This low-overhead SIM module with minor modifications can also be used to curb potential data duplication at router-link interfaces or within a router.

To reduce system requirements for the snooping invalidation module (e.g., 102, 102a, 102b) and to reduce overhead, several operations in the SIM module can be performed in parallel.

In the example of FIG. 3, the existing communication data channel between the PE and the NI that is established by AXI interface 202a may be used to communicate both packet data and SIM metadata (C, k, Bid_id operations "1" and "2"). Hence, no additional wires are needed to be added to transmit SIM metadata.

Operations "1" and "2" may be performed in parallel with AXI interface's ready and valid signal exchange to minimize the latency overhead. Also, there is no additional overhead involved in operations "3" to "5".

Operations "6" to "9" has been observed to be performable in one cycle in a NoC device that is clocked at 1 GHz frequency. Operations had been verified via FPGA synthesis of the modified NI using Xilinx HLS tool described in [25].

Although the snooping invalidation module 102b and associated operation in the network interface (e.g., 110b) may increase the number of pipeline stages of the NI microarchitecture, the additional overhead can be de minimis. The snooping invalidation module 102b circuitry itself may be implemented in memory to maintain a validation table and may use additional logic to perform XOR and comparison operations. In the example of FIG. 3, the snooping invalidation module 102b was observed to incur an increase of about 5.5% more power use and the resulting area of the IP core and network interface uses an additional 2.15% more area as compared to a baseline network interface that does not have such function. In the example of FIG. 3, a buffer capacity of 16 packets was implemented in a 22 nm technology node.

Discussion of Example Attack Model

Data-snooping attacks of NoC devices can be carried out by hardware trojans (HTs) embedded in NoC routers or by compromised links that enable the hardware trojans to modify the packet headers [9]-[12]. These hardware trojans, once activated, e.g., by a flit with an activation sequence, can make copies of packets passing through a compromised router and transmit the snooped packets to a compromised PE having a malicious accomplice task running on it. These hardware trojans can also diverts packets also to the compromised PE. It has been reported that this type of hardware trojans has a high area overhead (e.g., 4% as reported in [11]) and thus may be detected by testers during physical inspection or through side channel analysis. Further, it has been reported that this type of attack can lead to illegal utilization of router resources such as buffers, VCs, and switch allocators, which cause control logic violations that can be detected by secure model checkers [22].

In contrast, hardware trojans as embedded in a network interface for an IP core of a NoC device are not as easy to detect as when implemented in a router of the NoC device. Because the network interface naturally generates packets, a network interface comprised by a hardware trojan can duplicate extra packets using relatively modest logic change or additional and, thus, are harder to physically detect. In addition, because the network interface naturally generates packets, duplicate extra packets does not necessarily interfere with the basic functionality of the network interface. Thus, snoop attacks from hardware trojan embedded in network interface can be characterized as harder-to-detect attack as compared to those implemented in the router and, thus, the snooping invalidation module as disclosed herein addresses a more difficult technical problem associated with device security.

FIG. 6 shows an example attack model on the NoC device of FIG. 2 in accordance with an illustrative embodiment. The attack model involves a malicious software task coordinating a data-snooping attack, a microarchitecture modification of network interface (NI) with a hardware trojan are embedded in a packetizer module and a FIFO queue modification by the hardware trojan.

In FIG. 6, the NoC device, comprising a 2D NoC based manycore processor, is shown being subject to an ongoing data-snooping attack from multiple hardware trojans operating in a number of compromised NoC network interface modules (shown as 602). In FIG. 6, the NoC device is also shown executing malicious tasks on a PE connected to a compromised router (604) and compromised network interface (606). The hardware trojans in the various network interfaces (e.g., 602) make duplicate copies of packets in compromised network interface (e.g., 602), which can be picked up by the compromised router (e.g., 604) to route to the malicious task executing on a compromised PE (e.g., 606).

In FIG. 6, the microarchitecture of an NI may be modified with an embedded HT (shown as 608) in the packetizer module. In such a device, the network interface may receive messages from the PE via the AXI interface that are then stored in its buffers. The messages usually are read/write commands with address and data fields. The packetizer module appends source ID, destination ID, and virtual channel ID information to the commands and creates packets. A packet is further divided into flits, with the header flit containing the NoC routing related information. The packet flits are then injected into the circular flit queue that is accessed via head and tail pointers. After the packetizer injects a flit, the tail pointer of the queue is incremented. After a flit is transmitted to a router, the head pointer is incremented to transmit the next flit.

In this example, an HT can potentially tamper with the pointer values to re-send duplicate packets intelligently. For example, once a flit has been transmitted from the NI to the router, it stays in the cyclic queue until a new flit is overwritten on that location. The HT can keep track of these locations to read a header flit that has already been transmitted to the router and append it with a duplicate destination ID of the malicious node, and then update the headpointer.

FIG. 6 shows an example operation by the HT to modify (610) the head pointer. By moving the head pointer at regular intervals, the HT can send duplicate packet flits without having to store them externally. The duplicate packet is then re-sent to the router for transmission. If the flit queue is full (e.g., head pointer=tail pointer), both the HT and the packetizer can cease injecting new flits into the queue and refuse any more incoming data from the PE until the outstanding flits are transmitted. Indeed, the HT does not interfere with the control logic which is mostly present in the AXI interface, and an attacker can snoop on data using this HT in NIs between two PEs, or between a PE and a memory controller that is connected to main memory channels.

In this example, a network interface configured with such hardware trojan may be implemented using an additional ~5% flip-flops (FFs) and ~1% look-up-tables (LUTs)(1.3% area overhead) without incurring additional timing latency. Such low overhead HT can be inserted at the RTL level, or by reverse engineering and changing the netlist at the place and routing stage as reported in [5], [15]. The small size of the HT makes it hard to detect by physical inspection or by side-channel analysis. Also, the run-time secure model checkers from [21], [22] are not able to check the validity of flits in the NI as it does not interfere with the control logic. Hence, there is a benefit to design a low-overhead flit validation module in NIs to check flit validity before injecting them into the NoC.

Example Snooping Detection Module

In another aspect, an exemplary snooping detection circuit is disclosed that can further improve the security enhancement of the network interface, e.g., with the integrated snooping invalidation module. While the snooping invalidation module can invalidate and discard snooping attacks from duplicated flit header caused by malicious hardware trojans, the snooping detection circuit can be used to identify IP core that have been tampered with or that are malicious which can be a source of the snooping attack. As discussed above, the data-snooping detection circuit can be implemented to detect a source of an on-going attack. The snooping detection circuit may be used to detect data-snooping attacks at the processing element where an accomplice thread is executing.

The exemplary snooping detection circuit comprises a threshold activated snooping-attack detector that may be used to detect a given processing elements, or other IP core, as a source of the snooping attack.

Figure 7:
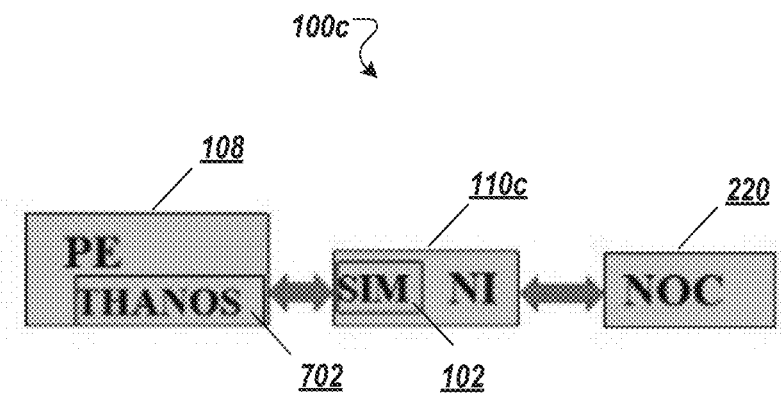
FIG. 7 shows a diagram of an IP core and associated network interface 110 of the NoC device 100 of FIG. 1 configured with an exemplary snooping detection circuit in accordance with an illustrative embodiment.

FIG. 7 shows a diagram of an IP core (shown as "PE" 108) and associated network interface 110 (shown as "NI" 110c) of the NoC device 100 (shown as 100c) of FIG. 1 configured with an exemplary snooping detection circuit (shown as "THANOS" 702) in accordance with an illustrative embodiment. As shown in FIG. 7, the snooping detection circuit 702 may be implemented at the interface between a network interface (e.g., 110c) and a processing element/IP core (e.g., 108) to detect a given processing element or the IP core, as a source of a snooping attack. A snooping attacks generally involve an intruder listening to traffic between two network devices on a network. The snooping detection circuit 702 can be independently implemented from the snooping invalidation module (e.g., 102) or it may be implemented in conjunction with the snooping invalidation module (e.g., 102) to further enhance the security of the NoC device (e.g., 100, 100a, 100b, 100c, etc.).

Notably, the snooping detection circuit 702 comprises a combination of analog and digital logic—which is difficult to reverse engineer or to tamper with as compared to an entirely digital logic implementation—to observe the ratio of incoming and outgoing messages over a period of few hours to quickly and accurately identify presence of a snooping attack. In particular, the snooping detection circuit 702 can coupled to a particular IP core and ascertain whether the IP core has been compromised for a snooping attack. The snooping detection circuit 702 may be implemented as a standalone module, or integrated module, that can also be used with prior data protection schemes to detect the source of attack, including those disclosed in [9]-[12], which are incorporated by reference herein in its entirety.

The snooping detection circuit 702, in some embodiments, forms a controlled aging module, e.g., as reported in [6], that uses threshold voltage degradation of NMOS transistors, to detect a processing element that is receiving duplicate packets injected from one or more hardware-trojan activated network interface(s) in the NoC device. The snooping detection circuit 702 is configured with NMOS transistors that undergo stress-recovery periods in their ON and OFF operations that leads to threshold voltage (Vth) degradation. Discussion of this phenomenon is provided in [28].

Figure 8:
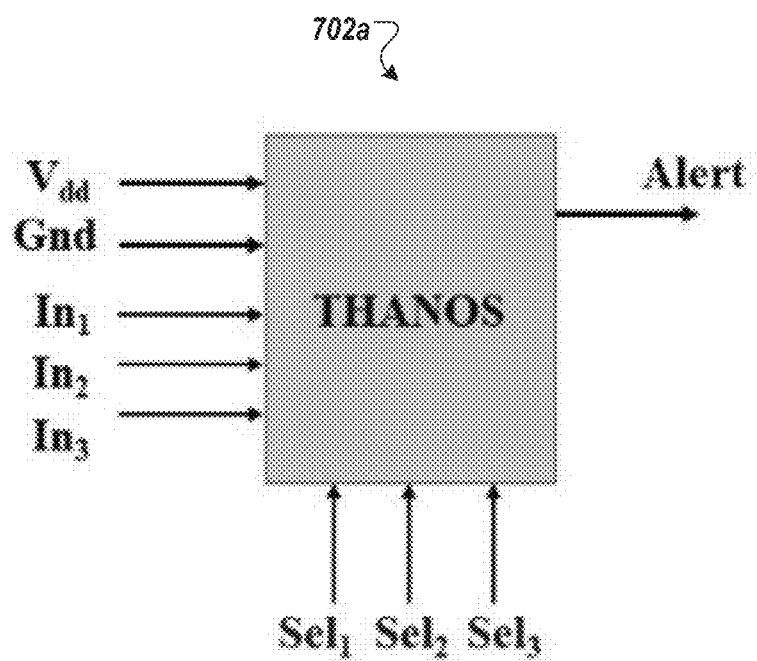
FIG. 8 shows a block diagram of the inputs and outputs of the snooping detection circuit of FIG. 7 in accordance with an illustrative embodiment.

FIG. 8 shows a block diagram of the inputs and outputs of the snooping detection circuit 702 (shown as "THANOS" 702a) of FIG. 7 in accordance with an illustrative embodiment.

Figure 9:
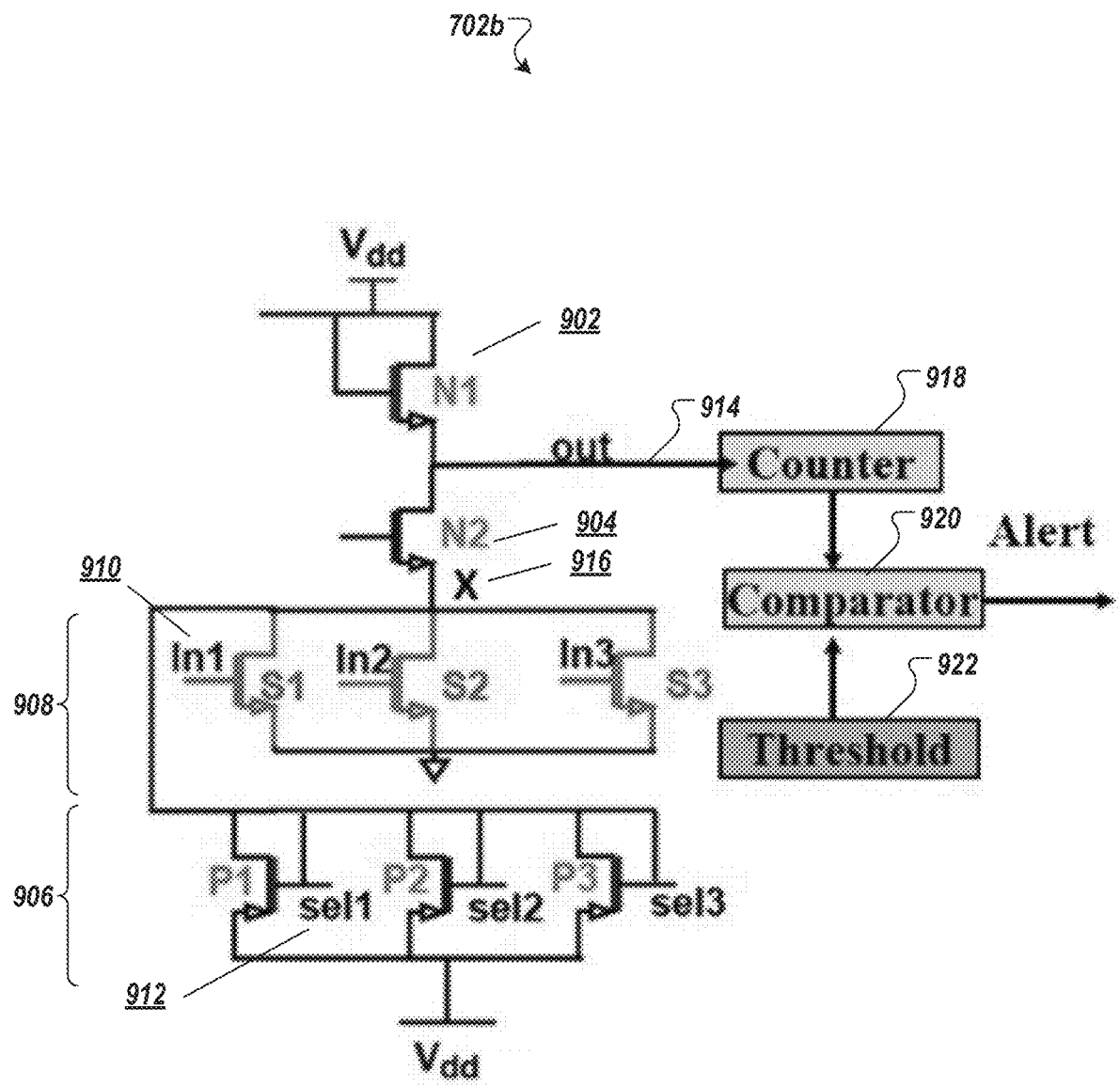
FIG. 9 shows an example implementation of the snooping detection circuit of FIGS. 7 and/or 8 in accordance with an illustrative embodiment.

FIG. 9 shows an example implementation of the snooping detection circuit 702 (shown as 702b) of FIGS. 7 and/or 8 in accordance with an illustrative embodiment.

Figure 10:
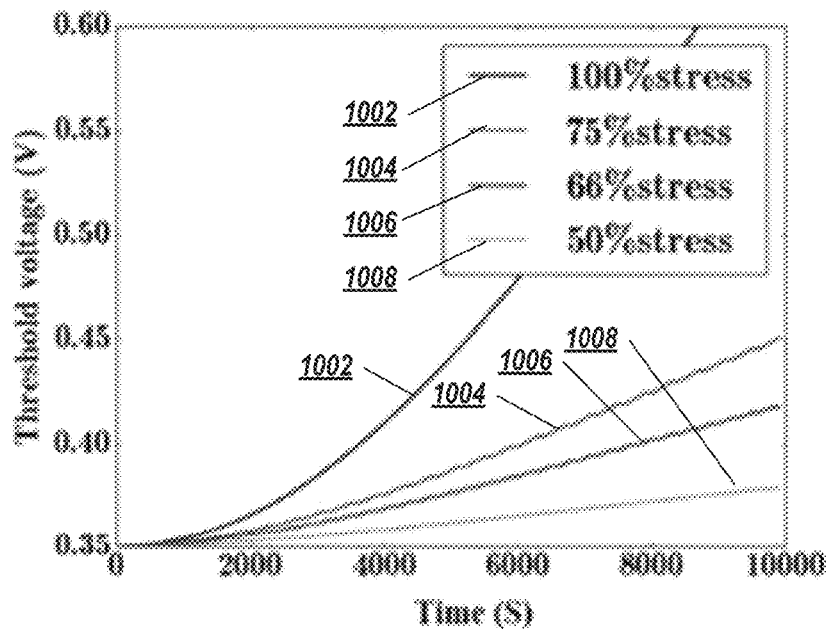
FIG. 10 shows voltage (Vth) degradation characteristics that can be observed across different ratios of stress and recovery in accordance with an illustrative embodiment.

FIG. 10 shows voltage (Vth) degradation characteristics that can be observed across different ratios of stress and recovery (shown as "50% stress" 1008, "66% stress" 1006, "75% stress" 1004, and "100% stress" 1002) in accordance with an illustrative embodiment. In FIG. 10, the voltage (Vth) degradation characteristics are shown in an NMOS transistor fabricated using 22 nm technology using a long-term aging model, e.g., similar to those reported in [28]. At 100% stress (no recovery) the Vth degradation characteristics of a transistor increases by ~100 mV in about two hours duration. The degradation characteristics is used in the snooping detection circuit 702 to detect snooping attacks.

Figure 11:
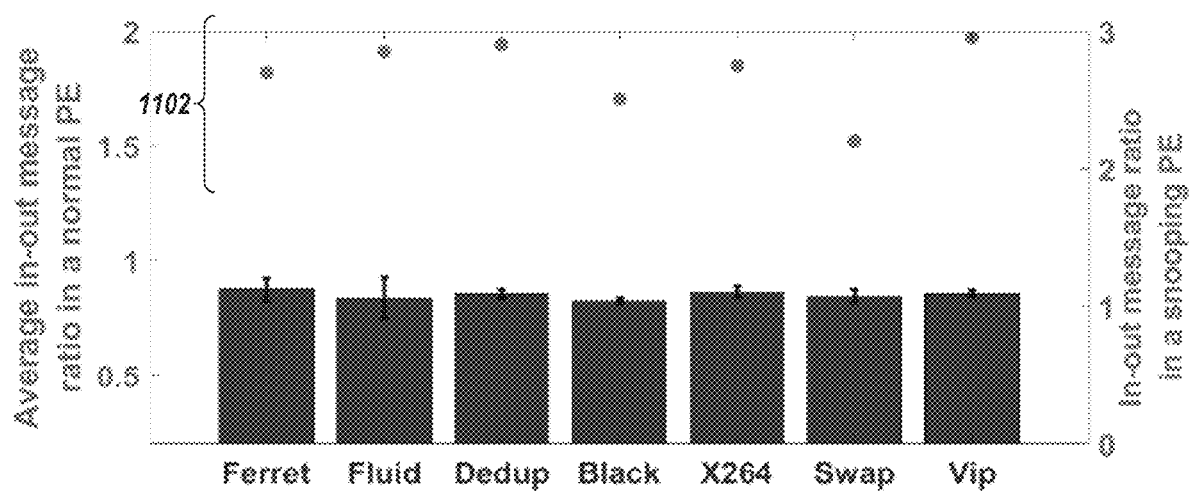
FIG. 11 shows analysis of the average incoming-outgoing message ratio between a normal processing elements of a NoC device and a compromised processing element of a NoC device across different benchmark applications in accordance with an illustrative embodiment.

FIG. 11 shows analysis of the average incoming-outgoing message ratio between a normal PE (left axis) and a snooping PE (right axis) across different benchmark applications (shown as Ferret, Fluid, Dedup, Black, X264, Swap, and Vip) in accordance with an illustrative embodiment. Indeed, a PE sends and receives various types of messages into the NoC device that can be broadly classified into two types: (1) direct messages between cores for inter-core communication, and (2) cache-coherence messages between a PE and directory table.

In FIG. 11, a benchmarked average incoming-outgoing message ratio for a given PE in a 64-core manycore NoC device is shown. The data is shown for different PAR-SECv2.1 benchmark applications as discussed in [27] with 64 tasks each. The error-bars represent variance across NoC nodes. In FIG. 11, it is observed that a ratio of less than "1" results across all the benchmarks in that each PE node receives a smaller number of messages than the messages it sends out (indeed, the number of "packets" in a "message" can vary based on message type). It is also observed that the incoming-outgoing message ratio is much greater than "1" when a data-snooping attack takes place (shown as 1102), likely because a PE would receive significantly higher number of messages (and packets) than it sends out. Although the phenomenon can be easily detected in the short term, e.g., via use of a counter in the NI and observing the number of incoming and outgoing messages over an epoch of time, merely observing messages in the short term can lead to false positives, e.g., due to periodic bursts of messages from a task that requires higher volumes of input data. Also, a message counter is readily securable and subject to reverse engineering techniques available to tamper digital logic, e.g., as reported in [15]. The use of degradation characteristics in the exemplary snooping detection circuit 702 is used to assess the incoming-outgoing message ratio characteristics for a given PE via a mixed analog and digital circuit as further discussed below.

Operation of snooping detection circuit. In FIG. 9, the snooping detection circuit 702 (shown as 702b) comprises at least two transistors "N1" 902 and "N2" 904 in which the transistor "N1" 902 acts as a diode connected load and the transistor "N2" 904t acts as gate-source voltage (Vgs) sensor. The two transistors are connected to a diode-connected PMOS transistors 906 (shown as "P1", "P2", and "P3") configured to pull the drain voltages of transistors 908 "S1", "S2", "S3" to high. Transistors 908 "S1", "S2", "S3" are driven using low over-drive voltages input 910 "In1", "In2", "In3" that barely switch them ON.

The snooping detection circuit is configured to artificially induce stress on one of a selected transistor 908 among "S1", "S2", "S3" (in this example) when a message is received and induce recovery when a message is sent out. Indeed, the transistors "S1", "S2", and "S3" (908) can be characterized as stress-transistors. Multiple transistors may be as stress-transistors because the detection operation would intentionally induce the voltage degradation of the transistor, so the multiple stress-transistors 908 can be used to provide a longer test cycle, when desired, in which at any point only one of selectable stress transistors "S1", "S2", "S3" are connected to the circuit using the respective "In" and "sel" signals (shown as 910 and 912). When any of the stress-transistor "S1", "S2", or "S3" 908 is turned "ON", the source (Vx) 916 of "N2" 904 is pulled low, which turns ON "N2" 904, leading to a "low" out state at output 914. And, when any one of a stressed transistor "S1", "S2", or "S3" 908 undergoes Vth degradation, its over-drive voltage (In=Vgs−Vth) is not high enough to turn ON the stress-transistor and hence drives it into the triode region where the source voltage (Vx) of "N1" 902 is not pulled low and the out signal is set to "high". Table 1 shows example state transition of snooping detection circuit.

TABLE 1

| Stress-transistors (S1/S2/S3) | Vx | N2 | Out |
| --- | --- | --- | --- |
| Saturated | Low | ON | Low |
| Triode | High | OFF | High |

As shown in Table 1, the states of different transistors and the corresponding changes is shown for a given out signal state.

For normal NoC traffic when a PE is not receiving snooped packets, its incoming-outgoing message ratio is less than "1". Hence, for normal NoC traffic, the stress-recovery ratio of a selected stress-transistors (among S1/S2/S3) is less than 40%. Generally, BTI and HCI are slow wear-out phenomenon in logic circuits. With a low over-drive (Vgs−Vth) voltage of ~100 mV being inputted to the stress-transistors through input signals In1/In2/In3, the circuit 702 would set the out signal 914 to a "high" state in a duration of 2-3 days.

And, when a malicious task on a PE is snooping, e.g., with up to four HT activated in NIs, its incoming-outgoing message ratio can be observed to be 3 times the average ratio (e.g., as shown in FIG. 11). To this end, the stress-transistors 908 in the snooping detection circuit (e.g., 702b) would undergo 80-90% more frequency of stress than recovery. As shown in FIG. 10, when a stress-transistor 908 receives ~90% stress, its threshold voltage increases over a shorter duration (~3-4 hours). Hence the snooping detection circuit can toggle the out signal to "high" state quicker when PE receives snooped packets.

The snooping detection circuit 702 includes i) a counter 918 to track the time taken for the "out" signal 914 to change its state and a comparator 920 to compare the counter time (from 918) with a threshold time (922). The threshold time 922 may be configured by a trusted PE firmware. The snooping detection circuit 702 sends an ALERT signal 924 when the time taken by the "out" signal 914 to switch the state is less than the threshold time 922. Indeed, the snooping detection circuit 702 can reliably send a notification indicating presence of a potential malicious task within ~2 hours and up to ~2 days depending on the number of HTs that are active. The trusted PE firmware then alerts the operating system (OS) about the malicious application task executing on the PE so preventive measures can be taken.

Indeed, due to artificially induced stress and recovery cycles applied to stress-transistors 910 in the snooping detection circuit 702, the stress-transistors (S1, S2, S3) wear-out much more rapidly than the rest of the chip. To increase the operable use time for the snooping detection circuit, the circuit employs a low over-drive voltage (In−Vth≈100 mV) and high Vdd using separate power lines for stress-transistors. To this end, after every state change of the out signal, the In signal is only incremented by ~100 mV to satisfy the MOS saturation condition (In−Vth<Vdd). Further, the stress-transistors are over-provisioned in which only one stress-transistor is selected at any time for use in the detection of an attack. Indeed, when an "In" voltage applied via 910 of a stress-transistor 908 can no longer be incremented without violating the saturation condition, the snooping detection circuit 702 can switch to a next stress-transistor using the "sel" signal 912. It is calculated that three stress-transistors operating with a Vdd=3V can be used in the snooping detection module 702 to seamlessly detect snooping attacks for up to 1.5 years. Indeed, the number of selectable stress-transistors 908 in the snooping detection circuit 702 may be increased (or decreased) to achieve a desired monitoring duration.

The overhead of snooping detection module 702b in the example of FIG. 9 is negligible in which the snooping detection module 702 consumed an additional power of ~50 μW and uses an additional area of ~0.9 μm$^2$ as compared to the baseline PE overhead that uses ~1 W and ~318 mm$^2$ (for a 22 nm technology node). In the example of FIG. 9, the snooping detection module 702b includes 8 MOSFET transistors (902, 904, 910, and 912), one counter (918), one comparator (920), and a simple control logic block to send input signals.

In some embodiments, the snooping detection module (e.g. 702, 702a, 702b) is configured to receive inputs (e.g., "In" and "Sel" inputs) from a given PE and is configured to also send a security alert signal to the same PE. To this end, the PE can identify itself as a source of data-snooping attack and take preventive steps to mitigate future attacks.

Indeed, the snooping detection circuit (e.g., 702, 702a, 702b) and/or snooping invalidation module (e.g., 102, 102a, 102b) can be used with other security mechanisms, e.g., ECC codes as discussed in [12] to address data corruption attacks, which can be detected and corrected readily. The snooping detection circuit (e.g., 702, 702a, 702b) and/or snooping invalidation module (e.g., 102, 102a, 102b) may be used together to proactively provide comprehensive protection against future snooping attacks and safeguard the application data for the entire lifetime of the processor. The exemplary security mechanism are intentionally configured to be difficult to be tampered by adversaries, including against the use reverse engineering techniques that insert HTs in the netlist. The snooping detection circuit (e.g., 702, 702*a*, 702*b*) and/or snooping invalidation module (e.g., 102, 102*a*, 102*b*) can operate irrespective of the HT triggering process used to start snooping attacks, including triggers such as special flit data, circuit aging, or temperature [23].

Experimental Results and Examples

A study was conducted to characterize the exemplified methods and systems on two popular photonics NoC (PNoC) architectures.

In the study, a 64-core manycore chip with low power ARM cortex-A73 cores and a 2D mesh NoC with 8×8 dimension was used to test the performance, latency, energy, and area overheads of the snooping invalidation module (e.g., 102, 102*a*, 102*b*) and the snooping detection circuit (e.g., 702, 702*a*, 702*b*) as compared to the state-of-the-art. In the study, simulations were performed to model the behavior of the snooping invalidation module (e.g., 102, 102*a*, 102*b*) and the snooping detection circuit (e.g., 702, 702*a*, 702*b*) using a cycle-accurate NoC simulator Noxim [29]. The study obtained the power and area overheads of snooping invalidation module (e.g., 102, 102*a*, 102*b*) and the snooping detection circuit (e.g., 702, 702*a*, 702*b*) from post-synthesis vector-less estimation in Vivado [25], and Cadence Virtuoso [31], at 22 nm. The study integrated the latency and energy overheads of the snooping invalidation module (e.g., 102, 102*a*, 102*b*) and the snooping detection circuit (e.g., 702, 702*a*, 702*b*) Noxim in said simulations and tested the instant security framework using PARSECv2.1 benchmark NoC traces generated by netrace [30] to capture the request-response dependencies to accurately simulate parallel application performance.

The study compared a NoC configured with snooping invalidation module (e.g., 102, 102*a*, 102*b*) and the snooping detection circuit (e.g., 702, 702*a*, 702*b*) against a baseline NoC in which with no security mechanism are employed as well as against two reported configurations "FortNoCs" [11] and "P-Sec" [12]. As reported in [11], only data obfuscation and data scrambling techniques are implemented for a fair comparison. In [12], end-to-end algebraic manipulation detection (AMD) and cyclic redundancy codes (CRC) are appended to the header flit for reliability against faults and HT attacks. The instant study used a threshold time in the snooping detection circuit (e.g., 702*b*) of ~2.5 days to get a security violation alert. The study measured results of application performance, NoC latency and NoC energy consumption for 4 actively snooping HTs that are randomly placed in NoC. In addition, the study measured results for scenarios with a single (1) and multiple (2) HTs operating in the test NoC.

Figure 12A:
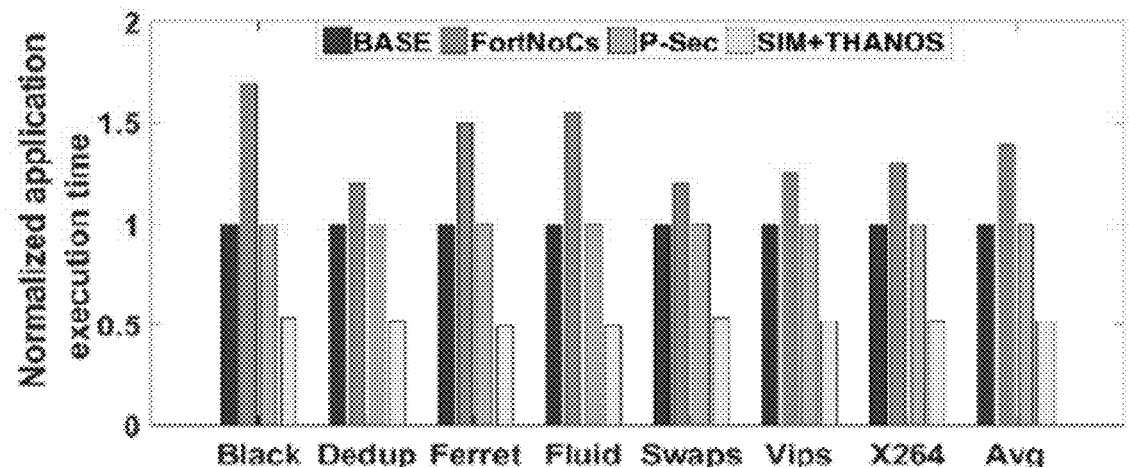
FIG. 12A shows experimental results comparing application execution time across 4 different NoC security mechanisms, including of the exemplary snooping invalidation module and snooping detection module in accordance with an illustrative embodiment.

FIG. 12A shows experimental results comparing application execution time across 4 different NoC security mechanisms: baseline (shown as "BASE"), a FortNoC configuration, a P-Sec configuration, and a NoC configuration having the instant snooping invalidation module and snooping detection module (shown as "SIM+THANOS"). From FIG. 12A, it is observed that snooping invalidation module and snooping detection module improves the execution time for a given benchmark application. Because the SIM (102) can discard duplicate data packets near the source, resulting in less NoC, it was observed that the operation can provide a 48.4% average improvement in application execution time as compared to the baseline. In contrast, P-Sec and FortNoCs, which cannot prevent the injection of duplicate packets at the NI and only discard faulty packets at the receiver, was observed to have higher NoC traffic. Moreover, PSec also takes two extra cycles for CRC+AMD encoding/decoding, and FortNoCs can take at least four extra cycles at the NI for node obfuscation and data scrambling techniques on the entire packet. This leads to poor application performance with P-Sec and FortNoCs compared to the baseline.

Figure 12B:
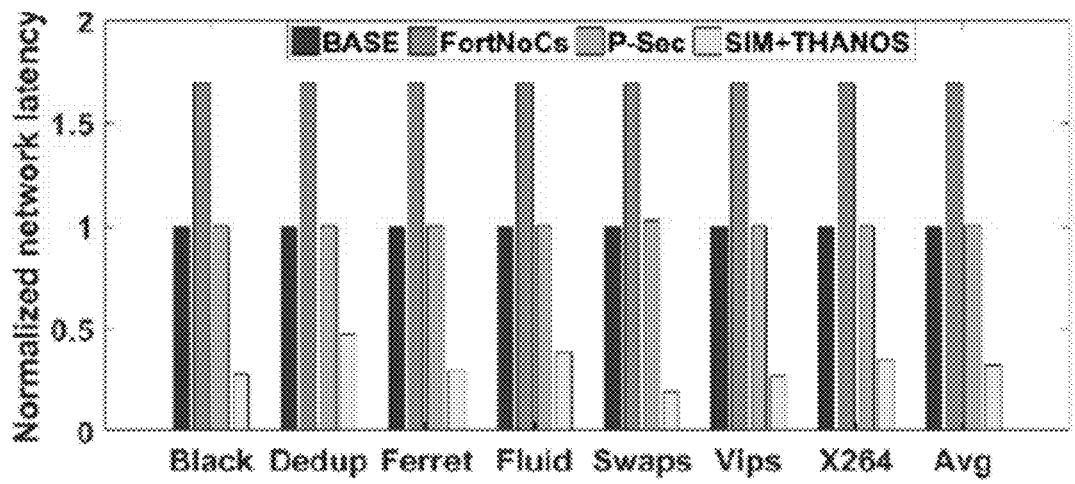
FIG. 12B shows experimental results comparing network latency across the same 4 different NoC security mechanisms as described in relation to FIG. 12A in accordance with an illustrative embodiment.

A similar trend is observed for network latency, shown in FIG. 12B. FIG. 12B shows experimental results comparing network latency across the same 4 different NoC security mechanisms. As shown in FIG. 12B, the network latency of FortNoCs is higher, which may be attributed to the packet scrambling mechanism that encrypts/decrypts the entire packet. Scrambling mechanism can be time consuming for packets with high payload size. FortNoCs may have incurred additional overhead due to packet authentication as an additional security mechanism. In contrast, the instant snooping invalidation module (e.g., 102) may be configured to use only one cycle at the sending network interface to detect duplicate packets while the snooping detection module (702), as a mixed signal implementation, has no latency overhead. In the study, it was observed that the snooping invalidation module (102) can discard duplicate packets in the NoC generated from active data-snooping HTs while having the lowest NoC latency performance, having on average a respective 67.8%, 77.3% and 68.1% latency reduction as compared to the baseline, FortNoCs, and PSec implementation.

Figure 12C:
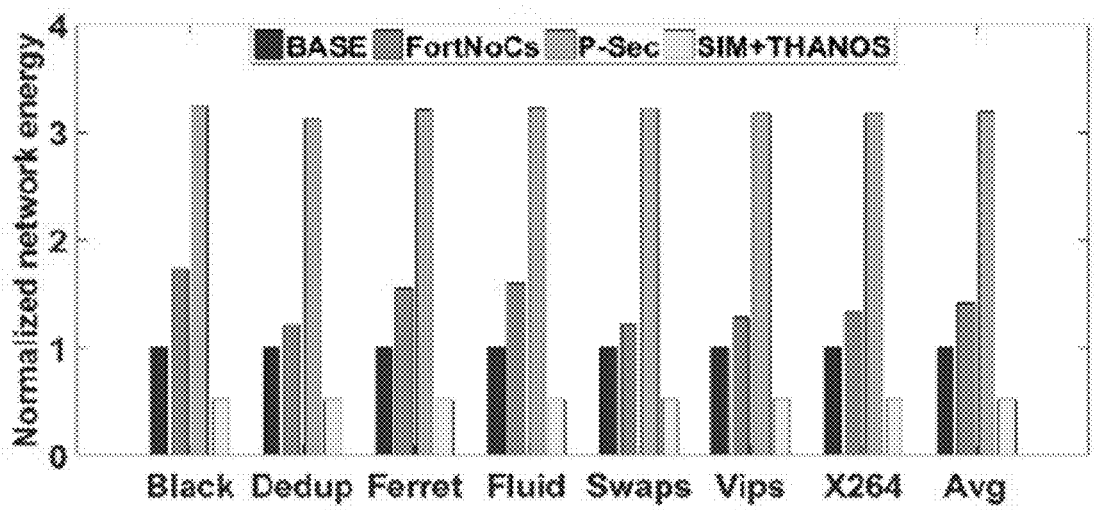
FIG. 12C shows experimental results comparing NoC energy consumption across the same 4 different NoC security mechanisms as described in relation to FIG. 12A in accordance with an illustrative embodiment.

FIG. 12C shows experimental results comparing NoC energy consumption across the same 4 different NoC security mechanisms. In the study, it was observed that implementation of the instant snooping invalidation module (e.g., 102) and the snooping detection module (702) can increase power usage at the network interface (about 5.5% additional power use), the energy consumption is nevertheless 47.8% lower as compared to baseline. This may be attributed to a reduction in application execution time in duplicated packet being discarded and thus removed from subsequently processing. In contrast, it was observed that FortNoCs consumed around 41.8% additional energy as compared to the baseline (e.g., likely due to increased execution time and the overheads incurred to employ XOR encryption/decryption logic in the NI). Similarly, it was observed that P-Sec consumed up to 200% more energy as compared to the baseline (e.g., likely due to the use of costly AMD, and CRC codec engines present in NIs and NoC routers). Indeed, P-Sec is much more expensive in providing similar combined safety against faults and snooping attacks.

Figure 12D:
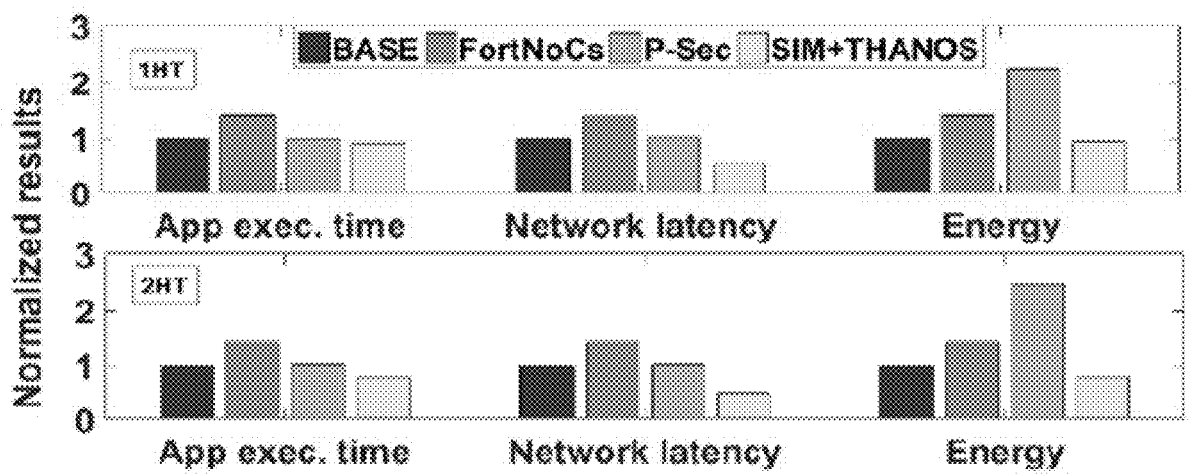
FIG. 12D shows the performance metrics of FIGS. 12A, 12B, and 12C for a single compromised network interface (1 HT) and for multiple compromised network interfaces (2 HT) in accordance with an illustrative embodiment.

FIG. 12D shows the performance metrics of FIGS. 12A, 12B, and 12C for a single compromised network interface (1 HT) and for multiple compromised network interfaces (2 HT). Specifically, in FIG. 12D, the normalized average values of application execution time, network latency, and NoC energy consumption are shown across the 4 different security mechanisms.

From FIG. 12D, it can be observed that similar trends as those observed in FIGS. 12A, 12B, and 12C continue with respect to application execution time, NoC energy, and latency performance even when fewer number of active HTs are tested. As shown in FIG. 12D, it is observed that the instant snooping invalidation module (e.g., 102) and the snooping detection module (702) performed better than the baseline unlike the FortNoCs and P-Sec implementations. Indeed, it can be concluded that the instant snooping invalidation module (e.g., 102) and the snooping detection module (702) does not trade-off NoC performance and NoC energy consumption to provide security.

The study also compared the area footprint of the snooping invalidation module (e.g., 102) and the snooping detection module (702) against the 2 other schemes. As shown in Table 2, it is observed that the snooping invalidation module (e.g., 102) and the snooping detection module (702) (shown as SIM+THANOS) can be implemented with the lowest area footprint amongst the three security mechanisms.

TABLE 2

| SIM + THANOS | FortNocs | P-Sec |
|---|---|---|
| 2.2 μm$^2$ | 4.9 μm$^2$ | 500 μm$^2$ |

From the study, it was observed that the snooping invalidation module (e.g., 102) and the snooping detection module (702) mechanism can be implemented using only 2.15% additional area in the NI to implement the packet validation mechanism.

Discussion

With the rise in number of processing cores and growing parallelism in applications, the communication traffic in a manycore processor has been increasing. Chip designers and manufacturers are moving towards network-on-chip (NoC) as their de-facto intra-chip communication fabric [1]-[2]. Typically, emerging manycore processors have tens to hundreds of components that are designed either by in-house engineers or obtained from third-party vendors (3PIP), and then finally integrated together in a single global facility. With the growing complexity in NoC design, designers are opting for third-party NoC IPs, e.g., [3], to connect the components in their processors. This global trend of distributed design, validation, and fabrication has led to major challenges in ensuring secure execution of applications on manycore platforms, in the presence of potentially untrusted hardware and software components.

Much work has been done to mitigate side-channel attacks on shared resources and to detect counterfeit ICs that compromise manycore chip performance [4], [6]. The exemplary snooping invalidation module (e.g., 102) and the snooping detection module (702) can be used to address orthogonal attack scenarios where an adversary has inserted a hardware Trojan (HT) into the RTL or the netlist of a manycore processor to disrupt or alter the integrity of its behavior without being detected at the post silicon verification stage. HTs can be inserted by an intellectual property (IP) vendor, untrusted CAD tool/designer, or at the foundry via reverse engineering [5]. Data-snooping attack are one such attacks where a malicious software and an HT work together to steal information from applications executing on manycore processors.

NoCs are ideal candidates for such attacks as they have a complex design that can be used to hide an HT which cannot be easily detected via functional verification. HTs can be placed in NoC links, routers, or network interfaces (NIs) to secretly snoop on the data or corrupt data passing through them. Typically, in data-snooping attacks HTs create duplicate packets with modified headers and send them into the NoC for an accomplice thread to receive them [11]. Several works proposed packet encoding/error correction mechanisms such as parity bits and ECC in NoC packets to detect faulty data packets at the receiver [7]-[8]. Other works such as [9]-[12] have also proposed data protection mechanisms in the presence of an HT in NoC components. However, there are potential shortcomings with the state-of-the-art: (1) these works assume the presence of HTs in NoC routers or links which can be detected by physical inspection or functional verification, without employing costly security mechanisms; (2) the mechanisms proposed in prior works protect application data from snooping attacks but do not detect the attack and mitigate future attacks; and (3) most of the security enhancement mechanisms are costly to implement and increase NoC latency and power consumption which worsens the overall performance. In contrast, the instant snooping invalidation module (e.g., 102) and the snooping detection module (702) are implementable, solely or in combination with these other techniques, using lightweight mechanisms that can detect the operation of malicious HTs embedded in NoCs and accomplice threads, and secure against their data-snooping attacks in emerging manycore processors.

Further, the study conducted to evaluate the snooping detection module (702) shows that this security enhancement do not notably increase performance and power overheads for a given NoC device. Indeed, the snooping detection module (702) can provide robust yet low-power mechanisms to detect the source of the attacks by utilizing controlled aging in circuits at runtime, which is not easy to obfuscate or tamper within the design and fabrication process.

Indeed, significant research has been done to increase robustness against attacks by HTs in NoCs by assuming that an HT can tamper or snoop data passing through it. In [9], bit shuffling and Hamming ECC are used to reduce the effectiveness of HTs that corrupt data. In [10], security zones managed by a centralized security manager are proposed to protect sensitive information from being accessed by malicious agents. In [11] data scrambling, packet authentication, and node obfuscation are proposed to prevent data stealing by a compromised NoC. Data scrambling, and packet-authentication mechanisms use a one-time pad XOR cipher that can be broken by the malicious tasks when enough encrypted packets are accumulated. In [12], CRC and algebraic manipulation detection (AMD) are used to encode packet headers to safeguard from faults and snooping attacks. In [13], a wave-based scheduling mechanism for NoCs is proposed that eliminates the need for TDMA-based NoC resource sharing, hence providing non-interference between different domains of applications. In [14], a process variation-based packet encoding and decoding mechanism is proposed to prevent data-snooping in silicon photonic NoCs. Most of these schemes that protect application data from NoC security attacks lack an efficient and low-power attack detection mechanism which makes them incomplete in providing security.

A few works address HT detection in NoC components at design-time and runtime. At design time, techniques such as physical inspection [15], functional testing [16], and side channel analysis [17] have been proposed. But testing for HTs at design time is still in infancy, and the growing complexity of NoC components make this even more difficult. A key logic built-in self-test (LBIST) was proposed in [18] that uses test vectors generated by programmable keys to detect Trojans. However, LBIST requires that the chip operation should be paused while testing at regular and frequent intervals, which is not suitable for NoCs that should function seamlessly. A few other works such as [19], [20] propose in-situ HT detection modules that rely on verification units placed in NoC components to detect HTs. Generally, there are limitations with all of these works: (1) the verification units used to detect HTs can also be reverse-engineered and tampered, (2) these mechanisms are used to detect only HT induced data-corruption attacks. Data-snooping attacks unlike data-corruption attacks attempt to leak critical application data to malicious software tasks. To this end, these works do not address the problem of detecting the software task that initiates data-snooping attacks to blacklist and prevent future attacks.

In [21], a run-time technique called NoC-Alert is proposed to detect failures in the control logic of NoC components. This technique is further enhanced by [22] that proposes modules which alert the host system if the control logic in NoC routers detects invariance violations caused by HTs placed in its control-path, e.g., logic for route computation (RC) or virtual channel allocation (VCA). However, these techniques focus on NoC components that have substantial control logic, such as routers. They ignore the network interface (NI) which prevents easy placement of model checkers to detect packet duplication. In this paper we propose a novel snooping invalidation module (SIM) in the NI that can mitigate snooping attacks. We then propose low-overhead techniques to detect the source of data-snooping attacks in NoCs. To the best of our knowledge, this is the first work that mitigates snooping attacks in NoCs with minimal performance and power overheads, while also detecting the source of snooping attack to protect against future attacks.

Indeed, the instant snooping invalidation module (e.g., 102) may be implemented as low-overhead mechanism to prevent data-snooping attacks that are initiated by HTs embedded in NoC network interfaces. In addition, the snooping detection module (702) may be implemented as a lightweight standalone snooping-attack detection mechanism that uses controlled circuit aging to detect the source of attacks that can help processors take preventive steps to mitigate future attacks.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; the number or type of embodiments described in the specification.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5).

Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications and publications as listed below and throughout this document are hereby incorporated by reference in their entirety herein.

[1] V. Y. Raparti, S. Pasricha "RAPID: Memory-Aware NoC for Latency Optimized GPGPU Architectures" IEEE Transactions on Multi-Scale Computing Systems, vol: 4, no: 4, pp. 874-887, October-December 2018.
[2] V. Y. Raparti, S. Pasricha "DAPPER: Data Aware Approximate NoC for GPGPU Architectures." Proc. IEEE/ACM NOCS 2018.
[3] Arteris, http://www.arteris.com/
[4] Y. Yarom et al., "FLUSH+RELOAD: A High Resolution, Low Noise, L3 Cache Side-Channel Attack." Proc. USENIX Security Sym. 2014.
[5] S. Bhunia, et al., "Hardware Trojan attacks: Threat analysis and countermeasures." Proc. IEEE, Vol: 102, no: 8, pp: 1229-1247, 2014.
[6] N. E. C. Akkaya, et al. "Secure chip odometers using intentional controlled aging." Proc. IEEE HOST 2018.
[7] D. Park et al. "Exploring fault-tolerant network-on-chip architectures." Proc. of the Intl. Conf. on Dependable Systems and Networks (DSN), 2006.
[8] S. Shamshiri, et al. "End-to-end error correction and online diagnosis for on-chip networks." Proc. of the International Test Conference (ITC), 2011.
[9] JYV Manoj Kumar, et al. "Run Time Mitigation of Performance Degradation Hardware Trojan Attacks in Network on Chip." Proc. IEEE Computer Society Annual Symposium on VLSI (ISVLSI), 2018.
[10] J. Sepúlveda, et al. "Reconfigurable security architecture for disrupted protection zones in NoC-based MPSoCs." Proc. IEEE ReCoSoC, 2015.
[11] D. Ancajas, et al. "Fort-nocs: Mitigating the threat of a compromised noc." Proc. ACM Design Automation Conference, 2014.
[12] T. Boraten, et al. "Packet security with path sensitization for NoCs." Proc. IEEE DATE, 2016.
[13] H. M. Wassel, et al. "SurfNoC: a low latency and provably non-interfering approach to secure networks-on-chip." Proc. ACM SIGARCH Computer Architecture News (Vol. 41, No. 3, pp. 583-594).
[14] S. V. R Chittamuru, I. Thakkar, S. Pasricha "SOTERIA: exploiting process variations to enhance hardware security with photonic NoC architectures." Proc. ACM//IEEE Design Automation Conference (DAC) 2018.
[15] S. Skorobogatov, "Physical attacks and tamper resistance," in Introduction to Hardware Security and Trust, Springer Berlin/Heidelberg, 2011.
[16] E. Dubrova, et al. "Secure and efficient LBIST for feedback shift register-based cryptographic systems," Proc. International Test Conf. (ITC), 2014.
[17] P. Kocher, et al., "Differential power analysis." Springer-Verlag, 1999.
[18] E. Dubrova, et al. "Keyed logic BIST for Trojan detection in SoC." Proc. IEEE International Symposium on System-on-Chip (SoC), 2014
[19] M. Oya, "In-situ Trojan authentication for invalidating hardware-Trojan functions." Proc. IEEE ISQED, 2016.
[20] M. Hussain, et al. "EETD: An Energy Efficient Design for Runtime Hardware Trojan Detection in Untrusted Network-on-Chip." Proc IEEE Computer Society Annual Symposium on VLSI (ISVLSI) 2018.
[21] A. Prodromou, et al. "Nocalert: An on-line and real-time fault detection mechanism for network-on-chip architectures." Proc. MICRO 2012.
[22] T. Boraten, et al. "Secure model checkers for Network-on-Chip (NoC) architectures." Proc. IEEE Great Lakes Symposium on VLSI, 2016.

[23] S. F. Mossa, et al. "Self-triggering hardware Trojan: Due to NBTI related aging in 3-D ICs." Integration, the VLSI Journal, Vol: 58, pp: 116-124, 2016.

[24] M. K. Papamichael, et al. "CONNECT: re-examining conventional wisdom for designing nocs in the context of FPGAs." Proc. FPGA, 2012.

[25] Vivado HLS tool, Xilinx. https://www.xilinx.com/products/designtools/vivado/integration/esl-design.html.

[26] S. R. Vangal, et al. "An 80-tile sub-100-w teraflops processor in 65-nm cmos." IEEE Journal of Solid-State Circuits, vol: 43, no: 1, pp. 29-41, 2008

[27] M. Gebhart, et al. "Running PARSEC 2.1 on M5, Technical Report TR-09-32", UT Austin, Department of Computer Science, October 2009

[28] S. Bhardwaj, et al. "Predictive modeling of the NBTI effect for reliable design." Proc. IEEE Custom Integrated Circuits Conference, 2006.

[29] V. Catania, et al. "Noxim: An open, extensible and cycle-accurate network on chip simulator." Proc. IEEE ASAP, 2015.

[30] J. Hestness, et al. "Netrace: dependency-driven trace-based network-on-chip simulation." Proc. ACM NocArch, 2010.

[31] Cadence, https://www.cadence.com/content/cadence-www/tools/customic-analog-rf-design/layout-design/virtuoso-layout-suite.html

What is claimed is:

1. A system comprising a plurality of processing units interconnected by a network-on-chip network, wherein each of the plurality of processing units is coupled to a network interface configured to generate a plurality of flits, wherein the system further comprises:
a snooping invalidation logic circuit configured to perform a validation operation to detect and discard a duplicate flit header generated in the network interface, wherein each of the plurality of flits are generated using an encoded key, the encoded key generated via XOR operators performed on: i) a counter associated with the flit, ii) a buffer index associated with the counter, and iii) a flit payload.

2. The system of claim 1, wherein:
each flit of the plurality of flits are further generated with a table index identifying a location of the counter as stored in a validation table of the snooping invalidation logic circuit, wherein the encoded key and the table index are co-indexed in a buffer of the network interface, and
the buffer is indexable for each of the plurality of flits by the buffer index associated with a given counter, and wherein each indexable location of the buffer includes an instance of the encoded key and an instance of the table index for each counter, and
the snooping invalidation logic circuit, during the validation operation, is configured to detect the duplicated header flit by determining a mismatch between i) a given encoded key retrieved from a given header flit and ii) an encoded key retrieved from the buffer at an indexed location determined from the table index retrieved from the given header flit.

3. The system of claim 1, wherein the validation operation to detect the duplicated header flit is performed in a single clock cycle of the each of the plurality of processing units.

4. The system of claim 1, wherein the snooping invalidation logic circuit comprises a validation table, a comparator having a buffer length of the encoded key, and a decoding XOR operator having the buffer length of the encoded key.

5. The system of claim 4, wherein the snooping invalidation logic circuit and associated validation table is lightweight employing an additional area of less than 5% to a baseline network interface configured to generate the same but lacking the snooping invalidation logic circuit and associated validation table.

6. The system of claim 1, wherein the snooping invalidation logic circuit is configured to invalidate the duplicate flit header generated by a malicious hardware trojan embedded in the network interface using the encrypted key.

7. The system of claim 1 further comprising:
a snooping detection module comprising a mixed-analog and digital transistor circuit implemented at respective interfaces between each respective processing unit, or a substantial portion, of the plurality of processing units and a corresponding network interface associated with the respective processing unit,
wherein the mixed-analog and digital transistor circuit is configured to transition between a saturated state and a triode state based on a ratio between signals received and transmitted through the mixed-analog and digital transistor circuit,
wherein the snooping detection module is configured to compare the transition time from the triode state to the saturated state and a threshold time, and
wherein the snooping detection module is configured to generate, based the comparison, at its output, a notification signal to the respective processing unit or a monitoring circuit, wherein the notification signal indicates the respective processing unit as a source of a snooping attack in the system.

8. The system of claim 7, wherein the snooping detection circuit comprises one or more MOS transistors configured to undergo stress-recovery periods in transitioning between ON and OFF operations that leads to threshold voltage (Vth) degradation of the one or more MOS transistors.

9. The system of claim 8, wherein the snooping detection circuit further comprises a second set of one or more MOS transistors configured to undergo stress-recovery periods in transitioning between ON and OFF operations that leads to threshold voltage (Vth) degradation of the second set of one or more MOS transistors, and wherein operation of the one or more MOS transistors and the second set of one or more MOS transistors are selectable via inputs of the snooping detection circuit.

10. The system of claim 9, wherein the snooping detection circuit uses the second set of one or more MOS transistors after the one or more MOS transistors has degraded from the threshold voltage (Vth) degradation.

11. The system of claim 10, wherein the one or more MOS transistors comprise a PMOS or NMOS transistor.

12. The system of claim 1, wherein the plurality of processing units collectively form a manycore chip comprising at least 64 cores.

13. The system of claim 12, wherein the manycore chip comprises a multiprocessor system on chip (MPSoC) or chip multiprocessors (CMPs).

14. A method of operating the plurality of processing units interconnected by the network-on-chip network of claim 1, wherein the method comprises:
generating the plurality of flits each comprising i) the encoded key, and ii) a table index identifying the location of the counter as stored in a validation table of the snooping invalidation logic circuit; and
detecting the duplicated header flit by determining a mismatch between i) the encoded key retrieved from each respective flit of the plurality of flits, and ii) an encoded key retrieved from a buffer at the indexed location determined from the table index.

15. The method of claim 14, further comprising:

encoding the encoded key encoded from at least the counter associated with each respective flit.

16. The method of claim 14, further comprising:

monitoring, via a snooping detection module, signals received and transmitted for a given processing unit configured with the snooping detection module,
   wherein the snooping detection module comprises a mixed-analog and digital transistor circuit configured to transition between a saturated state and a triode state based on a ratio between the signals received and transmitted through the mixed-analog and digital transistor circuit, wherein the snooping detection module is configured to compare i) the transition time from the triode state to the saturated state and ii) a threshold time, and
   wherein the snooping detection module is configured to generate, based the comparison, at its output, a notification signal to the respective processing unit or a monitoring circuit, wherein the notification signal indicates the respective processing unit as a source of a snooping attack in the system; and generating the notification for the given processing unit when the resulting transition time for the snooping detection module exceeds the compared threshold time, wherein the notification provides an indication that the given processing unit is a source of a snooping attack.

17. The method of claim 16, wherein the threshold time is configured so the notification is generated after 2 hours of the given processing unit performing a potential malicious task.

18. A system comprising a plurality of processing units interconnected by a network-on-chip communication, wherein each of the plurality of processing units is coupled to a network interface configured to generate a plurality of flits, wherein the system further comprises:
   a snooping invalidation means for detecting and discarding a duplicate flit header generated in the network interface by a hardware trojan embedded in the network interface,
   wherein each of the plurality of flits are generated using an encoded key, the encoded key generated via XOR operators performed on: i) a counter associated with the flit, ii) a buffer index associated with the counter, and iii) a flit payload.

19. The system of claim 18 further comprising:
   a snooping detection means for detecting source within the system of snooping attacks, wherein the source comprises a hardware trojan embedded in the system.

* * * * *